US012041041B2

(12) United States Patent
Colon et al.

(10) Patent No.: US 12,041,041 B2
(45) Date of Patent: *Jul. 16, 2024

(54) LOCATION-BASED MOBILE DEVICE AUTHENTICATION

(71) Applicant: TRUIST BANK, Charlotte, NC (US)

(72) Inventors: Reinaldo Gamaliel Rivera Colon, Raleigh, NC (US); Everardo Calamaco, Jr., Louisburg, NC (US); Michaela Rose Cestari, Cary, NC (US)

(73) Assignee: Truist Bank, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,274

(22) Filed: Oct. 14, 2022

(65) Prior Publication Data
US 2023/0034319 A1 Feb. 2, 2023

Related U.S. Application Data

(63) Continuation of application No. 16/998,030, filed on Aug. 20, 2020, now Pat. No. 11,509,642.

(Continued)

(51) Int. Cl.
*H04L 9/40* (2022.01)
*H04W 4/021* (2018.01)
(Continued)

(52) U.S. Cl.
CPC .............. *H04L 63/08* (2013.01); *H04L 63/10* (2013.01); *H04W 4/021* (2013.01); *H04W 4/029* (2018.02);

(Continued)

(58) Field of Classification Search
None
See application file for complete search history.

(56) References Cited

U.S. PATENT DOCUMENTS 6,385,312 B1 * 5/2002 Shaffer .................. H04W 4/02
379/207.14
7,841,513 B1 * 11/2010 Katzer ................... G06Q 10/00
340/572.1

(Continued)

OTHER PUBLICATIONS

Avdyushkin et al "Secure Location Validation with Wi-Fi Geo-Fencing and NFC," 2015 IEEE Trustcom/BigDataSE/ISPA, IEEE Computer Society, pp. 890-896 (Year: 2015).*

(Continued)

*Primary Examiner* — Luu T Pham
*Assistant Examiner* — James J Wilcox
(74) *Attorney, Agent, or Firm* — Kilpatrick Townsend & Stockton LLP; Michael A. Springs, Esq.

(57) ABSTRACT

A computer server may receive location data from a mobile client device and may compare the location data to predefined secure location definitions, which may be trusted or private locations. The computer server may receive a request from the mobile client device to access network resources or services, and the computer server may determine, using a result of comparing the location data and the one or more predefined secure location definitions, an authentication process for providing the mobile client device with access to the network resources or services. The computer server may execute the authentication process and may provide the mobile client device with access to the network resources or services.

17 Claims, 5 Drawing Sheets

Related U.S. Application Data

(60) Provisional application No. 62/889,731, filed on Aug. 21, 2019.

(51) Int. Cl.
| | |
|---|---|
| *H04W 4/029* | (2018.01) |
| *H04W 4/80* | (2018.01) |
| *H04W 12/06* | (2021.01) |
| *H04W 12/08* | (2021.01) |
| *H04W 12/61* | (2021.01) |
| *H04W 12/63* | (2021.01) |
| *H04W 12/73* | (2021.01) |

(52) U.S. Cl.
CPC .............. *H04W 4/80* (2018.02); *H04W 12/06* (2013.01); *H04W 12/08* (2013.01); *H04W 12/61* (2021.01); *H04W 12/63* (2021.01); *H04W 12/73* (2021.01)

(56) References Cited

U.S. PATENT DOCUMENTS

| | | | | |
|---|---|---|---|---|
| 8,195,198 | B1* | 6/2012 | Shaw | H04W 48/04 455/456.4 |
| 8,438,066 | B1 | 5/2013 | Yuen | G06Q 20/4015 705/16 |
| 8,442,527 | B1* | 5/2013 | Machiraju | H04W 12/069 713/184 |
| 8,577,731 | B1* | 11/2013 | Cope | G06Q 20/3224 705/52 |
| 8,584,200 | B2* | 11/2013 | Frank | H04W 12/06 455/410 |
| 8,625,796 | B1* | 1/2014 | Ben Ayed | H04W 12/64 380/258 |
| 8,646,060 | B1* | 2/2014 | Ben Ayed | H04W 4/20 726/9 |
| 8,668,568 | B2* | 3/2014 | Denker | G07F 17/329 709/217 |
| 8,775,059 | B2* | 7/2014 | Heed | G06Q 10/047 701/117 |
| 8,850,050 | B1* | 9/2014 | Qureshi | G06F 21/6218 709/227 |
| 8,893,293 | B1* | 11/2014 | Schmoyer | H04L 63/0428 726/4 |
| 8,905,303 | B1* | 12/2014 | Ben Ayed | G06Q 20/401 235/375 |
| 8,955,069 | B1* | 2/2015 | Dotan | H04L 63/0861 726/9 |
| 9,032,498 | B1* | 5/2015 | Ben Ayed | G06F 21/35 726/9 |
| 9,038,015 | B1* | 5/2015 | Allsbrook | G06F 8/30 717/102 |
| 9,075,979 | B1* | 7/2015 | Queru | H04W 64/00 |
| 9,119,068 | B1* | 8/2015 | Hubble | H04W 12/06 |
| 9,140,552 | B2 | 9/2015 | Pereira | H04W 4/18 |
| 9,160,726 | B1 | 10/2015 | Kaufman | H04L 63/08 |
| 9,218,432 | B2 | 12/2015 | Miasnik | G16H 50/20 |
| 9,264,419 | B1* | 2/2016 | Johansson | G06F 21/45 |
| 9,271,110 | B1* | 2/2016 | Fultz | H04W 4/029 |
| 9,305,149 | B2* | 4/2016 | Grigg | H04L 63/083 |
| 9,323,912 | B2* | 4/2016 | Schultz | G06F 21/32 |
| 9,332,434 | B1* | 5/2016 | Dotan | H04W 12/06 |
| 9,350,717 | B1* | 5/2016 | Siddiqui | H04W 12/64 |
| 9,407,754 | B1* | 8/2016 | Benoit | H04L 63/1425 |
| 9,412,278 | B1* | 8/2016 | Gong | G08G 5/0078 |
| 9,438,604 | B1* | 9/2016 | Addala | H04L 63/0853 |
| 9,465,582 | B1* | 10/2016 | Whelan | H04L 9/3297 |
| 9,544,306 | B2* | 1/2017 | Brannon | G06F 21/45 |
| 9,557,807 | B2* | 1/2017 | Mick | G06Q 10/06 |
| 9,578,596 | B1* | 2/2017 | Rodoper | H04W 48/16 |
| 9,619,852 | B2* | 4/2017 | Dutt | H04L 63/08 |
| 9,641,489 | B1* | 5/2017 | Kaufman | H04W 12/12 |
| 9,642,005 | B2* | 5/2017 | Fosmark | G06Q 20/4014 |
| 9,667,584 | B2* | 5/2017 | Archibong | H04W 4/80 |
| 9,712,978 | B2* | 7/2017 | Stewart | H04W 4/021 |
| 9,769,604 | B2* | 9/2017 | Lyman | H04W 4/021 |
| 9,779,418 | B2* | 10/2017 | Hardin | H04W 4/029 |
| 9,781,106 | B1* | 10/2017 | Vitus | G06F 21/316 |
| 9,786,145 | B2* | 10/2017 | Oppenheimer | G06K 7/10009 |
| 9,854,397 | B1* | 12/2017 | Melson | G06Q 50/265 |
| 9,973,514 | B2* | 5/2018 | Hu | H04W 12/02 |
| 10,033,540 | B2* | 7/2018 | Lea | H04W 12/50 |
| 10,057,227 | B1* | 8/2018 | Hess | G06F 21/31 |
| 10,169,937 | B1* | 1/2019 | Zwink | G07C 9/23 |
| 10,206,099 | B1* | 2/2019 | Trinh | H04W 4/021 |
| 10,225,737 | B1* | 3/2019 | Mulders | H04L 63/0861 |
| 10,277,586 | B1* | 4/2019 | Yau | H04L 63/0807 |
| 10,282,574 | B1* | 5/2019 | Tyagi | G01S 5/021 |
| 10,332,104 | B2* | 6/2019 | Prakash | G06Q 20/3674 |
| 10,354,246 | B1* | 7/2019 | Janiga | G07F 19/204 |
| 10,387,825 | B1* | 8/2019 | Canavor | H04W 4/02 |
| 10,397,208 | B2* | 8/2019 | Eramian | G06V 40/10 |
| 10,405,366 | B1* | 9/2019 | Liu | H04W 24/02 |
| 10,430,786 | B1* | 10/2019 | Camacho | H04L 9/3268 |
| 10,489,827 | B2* | 11/2019 | Adinarayan | H04W 4/029 |
| 10,496,988 | B2* | 12/2019 | Sivashanmugam | G06Q 20/202 |
| 10,521,241 | B1* | 12/2019 | Ha | G06F 21/31 |
| 10,567,253 | B1* | 2/2020 | O'Toole | H04L 67/54 |
| 10,575,138 | B1* | 2/2020 | Klinkner | G08B 21/24 |
| 10,637,872 | B2* | 4/2020 | Solow | H04N 21/25841 |
| 10,657,806 | B1* | 5/2020 | Burcham | H04W 4/029 |
| 10,708,722 | B1* | 7/2020 | Klinkner | G01S 5/02 |
| 10,735,909 | B1* | 8/2020 | Klinkner | H04W 4/029 |
| 10,764,752 | B1* | 9/2020 | Avetisov | H04W 12/08 |
| 10,771,458 | B1* | 9/2020 | Xia | H04W 12/64 |
| 10,825,038 | B2* | 11/2020 | Walz | H04W 12/08 |
| 10,841,801 | B1* | 11/2020 | Balasingh | H04W 4/027 |
| 10,986,082 | B2* | 4/2021 | Singleton, IV | G06F 9/5027 |
| 11,005,839 | B1* | 5/2021 | Shahidzadeh | H04W 12/06 |
| 11,087,011 | B2* | 8/2021 | Xu | G06F 21/6218 |
| 11,106,806 | B1* | 8/2021 | Lyons | G06K 19/06028 |
| 11,216,830 | B1* | 1/2022 | Bobe | G01C 21/20 |
| 11,263,617 | B2* | 3/2022 | Hurley | G06Q 30/0641 |
| 11,406,196 | B2* | 8/2022 | Canfield | G06F 21/44 |
| 11,425,639 | B2* | 8/2022 | Baltar | H04L 63/00 |
| 11,431,838 | B1* | 8/2022 | Avula | H04M 1/72457 |
| 11,455,641 | B1* | 9/2022 | Shahidzadeh | H04L 63/0892 |
| 11,562,342 | B1* | 1/2023 | Goodrich | H04W 12/08 |
| 11,570,737 | B1* | 1/2023 | Wallace | H04W 60/00 |
| 11,797,706 | B2* | 10/2023 | Whitkin | H04L 63/08 |
| 2002/0125886 | A1* | 9/2002 | Bates | H04L 63/104 324/309 |
| 2002/0165910 | A1* | 11/2002 | Brown | H04L 67/52 715/740 |
| 2003/0041125 | A1* | 2/2003 | Salomon | G06F 8/61 709/220 |
| 2003/0046273 | A1* | 3/2003 | Deshpande | G06F 16/9537 706/45 |
| 2004/0081206 | A1* | 4/2004 | Allison | H04W 88/184 370/522 |
| 2004/0193368 | A1* | 9/2004 | Sanqunetti | G06T 3/60 340/988 |
| 2004/0203771 | A1* | 10/2004 | Chang | H04W 76/10 455/414.1 |
| 2004/0224664 | A1* | 11/2004 | Guo | H04W 12/08 455/411 |
| 2005/0101297 | A1* | 5/2005 | Delaney | H04Q 3/0025 455/403 |
| 2005/0135624 | A1* | 6/2005 | Tsai | H04L 63/0853 380/270 |
| 2006/0069914 | A1* | 3/2006 | Rupp | H04L 63/0853 713/168 |
| 2006/0069916 | A1* | 3/2006 | Jenisch | H04L 63/0846 713/172 |
| 2006/0105744 | A1* | 5/2006 | Frank | H04L 63/0861 455/410 |
| 2006/0189382 | A1* | 8/2006 | Muir | G07F 17/32 463/29 |
| 2006/0221900 | A1* | 10/2006 | Zhang | H04W 36/0011 370/469 |

(56) References Cited

U.S. PATENT DOCUMENTS

| | | | |
|---|---|---|---|
| 2006/0282671 A1* | 12/2006 | Burton | G16H 10/60 713/176 |
| 2007/0011022 A1* | 1/2007 | Wright | G06Q 10/087 705/26.1 |
| 2007/0014259 A1* | 1/2007 | Fajardo | H04W 36/0011 370/331 |
| 2007/0021198 A1* | 1/2007 | Muir | G07F 17/3262 463/29 |
| 2007/0030826 A1* | 2/2007 | Zhang | H04W 36/36 370/331 |
| 2007/0041344 A1* | 2/2007 | Yaqub | H04W 36/005 709/230 |
| 2007/0109119 A1* | 5/2007 | Zhang | G01D 21/00 706/45 |
| 2007/0136573 A1* | 6/2007 | Steinberg | H04L 63/0853 713/155 |
| 2007/0140256 A1* | 6/2007 | Yaqub | H04W 28/0226 370/332 |
| 2007/0248049 A1* | 10/2007 | Fajardo | H04W 36/02 370/331 |
| 2008/0031227 A1* | 2/2008 | Wang | H04L 65/1095 370/352 |
| 2008/0072300 A1* | 3/2008 | Garbow | H04L 63/0815 726/8 |
| 2008/0098464 A1* | 4/2008 | Mizrah | G06F 21/36 726/5 |
| 2008/0109446 A1* | 5/2008 | Wang | H04L 65/1016 |
| 2008/0117451 A1* | 5/2008 | Wang | H04L 65/40 358/1.15 |
| 2008/0130647 A1* | 6/2008 | Ohba | H04W 12/062 370/392 |
| 2008/0151847 A1* | 6/2008 | Abujbara | G06F 21/629 370/338 |
| 2008/0163372 A1* | 7/2008 | Wang | G06F 21/56 726/24 |
| 2008/0276068 A1* | 11/2008 | Ashraf | H04L 65/1043 710/1 |
| 2008/0299959 A1* | 12/2008 | Geyer | H04W 4/024 455/418 |
| 2008/0307515 A1* | 12/2008 | Drokov | G06Q 20/4093 726/7 |
| 2009/0006199 A1* | 1/2009 | Wang | H04L 67/30 705/14.66 |
| 2009/0187983 A1* | 7/2009 | Zerfos | H04W 12/069 726/10 |
| 2009/0221265 A1* | 9/2009 | Liu | H04L 63/0853 455/411 |
| 2009/0249405 A1* | 10/2009 | Karaoguz | H04N 21/2343 725/62 |
| 2009/0249406 A1* | 10/2009 | Gordon | H04N 21/4325 725/62 |
| 2009/0249413 A1* | 10/2009 | Karaoguz | H04N 21/41407 725/105 |
| 2009/0249422 A1* | 10/2009 | Chen | H04N 21/4627 725/116 |
| 2009/0249424 A1* | 10/2009 | Gordon | H04N 21/4524 348/553 |
| 2009/0254975 A1* | 10/2009 | Turnbull | H04W 4/029 709/205 |
| 2009/0322890 A1* | 12/2009 | Bocking | H04N 1/00323 455/419 |
| 2010/0022254 A1* | 1/2010 | Ashfield | H04L 63/107 455/456.6 |
| 2010/0024017 A1* | 1/2010 | Ashfield | G06F 21/35 726/7 |
| 2010/0073229 A1* | 3/2010 | Pattabiraman | H04W 72/0446 342/357.64 |
| 2010/0082486 A1* | 4/2010 | Lee | G06Q 20/322 455/411 |
| 2010/0131304 A1* | 5/2010 | Collopy | G06Q 30/0224 705/4 |
| 2010/0136956 A1* | 6/2010 | Drachev | H04W 4/02 455/414.2 |
| 2010/0159879 A1* | 6/2010 | Salkini | H04W 12/082 455/26.1 |
| 2010/0182145 A1* | 7/2010 | Ungari | G09B 29/10 345/173 |
| 2010/0246468 A1* | 9/2010 | Santhanam | H04W 48/04 370/312 |
| 2011/0063138 A1* | 3/2011 | Berkobin | G08G 1/207 340/988 |
| 2011/0086611 A1* | 4/2011 | Klein | H04M 15/00 455/407 |
| 2011/0096354 A1* | 4/2011 | Liu | G06F 3/1292 358/1.15 |
| 2011/0137804 A1* | 6/2011 | Peterson | G06Q 20/40 705/77 |
| 2011/0201305 A1* | 8/2011 | Buer | H04W 12/02 455/410 |
| 2011/0202466 A1* | 8/2011 | Carter | H04W 4/023 705/67 |
| 2011/0212735 A1* | 9/2011 | Buer | H04W 4/02 455/456.3 |
| 2011/0222471 A1* | 9/2011 | Abraham | H04W 4/20 370/328 |
| 2011/0227788 A1* | 9/2011 | Lundgren | G01S 19/49 342/357.34 |
| 2011/0314515 A1* | 12/2011 | Hernoud | H04W 12/069 726/2 |
| 2012/0046110 A1* | 2/2012 | Amaitis | A63F 13/87 463/43 |
| 2012/0058826 A1* | 3/2012 | Amaitis | A63F 13/35 463/43 |
| 2012/0079567 A1* | 3/2012 | Van De Groenendaal | H04M 1/72463 726/4 |
| 2012/0113971 A1* | 5/2012 | Giaretta | H04W 48/20 370/338 |
| 2012/0115505 A1* | 5/2012 | Miyake | H04W 4/027 455/456.1 |
| 2012/0130632 A1* | 5/2012 | Bandyopadhyay | G01C 21/206 342/357.3 |
| 2012/0131167 A1* | 5/2012 | Shen | H04L 65/1016 709/223 |
| 2012/0131650 A1* | 5/2012 | Gutt | H04B 7/18593 726/5 |
| 2012/0144461 A1* | 6/2012 | Rathbun | G06Q 20/4014 726/5 |
| 2012/0149330 A1* | 6/2012 | Watson | H04L 63/0853 455/411 |
| 2012/0180110 A1* | 7/2012 | Jarman | H04L 63/126 726/3 |
| 2012/0182180 A1* | 7/2012 | Wolf | G01S 5/145 342/357.29 |
| 2012/0222089 A1* | 8/2012 | Whelan | H04L 67/535 709/224 |
| 2012/0223830 A1* | 9/2012 | Tyler | B60Q 5/005 340/450.2 |
| 2012/0238247 A1* | 9/2012 | Wen | H04W 76/12 455/411 |
| 2012/0246074 A1* | 9/2012 | Annamalai | H04W 4/029 455/456.2 |
| 2012/0252411 A1* | 10/2012 | Johnsgard | H04L 63/0861 455/411 |
| 2012/0268241 A1* | 10/2012 | Hanna | G06F 21/32 340/5.52 |
| 2012/0309416 A1* | 12/2012 | Whelan | H04L 9/3271 455/456.1 |
| 2012/0314625 A1* | 12/2012 | Bruce | H04L 51/222 370/259 |
| 2012/0316963 A1* | 12/2012 | Moshfeghi | G06Q 20/327 705/14.58 |
| 2012/0330769 A1* | 12/2012 | Arceo | G06Q 20/4014 455/411 |
| 2013/0012205 A1* | 1/2013 | Noonan | H04W 48/04 455/438 |

(56) References Cited

U.S. PATENT DOCUMENTS

| | | | |
|---|---|---|---|
| 2013/0019317 A1* | 1/2013 | Whelan | H04L 9/3297 726/26 |
| 2013/0031598 A1* | 1/2013 | Whelan | H04W 12/08 726/28 |
| 2013/0067552 A1* | 3/2013 | Hawkes | H04W 12/08 726/7 |
| 2013/0073388 A1* | 3/2013 | Heath | G06Q 50/01 705/14.53 |
| 2013/0081119 A1* | 3/2013 | Sampas | G06Q 20/40145 726/7 |
| 2013/0091452 A1* | 4/2013 | Sorden | G06F 30/20 715/771 |
| 2013/0104198 A1* | 4/2013 | Grim | H04W 4/023 726/4 |
| 2013/0121321 A1* | 5/2013 | Backes | H04L 12/4645 370/338 |
| 2013/0139196 A1* | 5/2013 | Sokolov | H04N 21/6175 725/25 |
| 2013/0143586 A1* | 6/2013 | Williams | H04W 4/021 455/456.1 |
| 2013/0145420 A1* | 6/2013 | Ting | H04L 63/08 726/1 |
| 2013/0152155 A1* | 6/2013 | Donfried | G06Q 30/00 726/1 |
| 2013/0159195 A1* | 6/2013 | Kirillin | H04L 63/105 705/71 |
| 2013/0173470 A1* | 7/2013 | Nuzzi | G06Q 20/3224 726/4 |
| 2013/0183935 A1* | 7/2013 | Holostov | H04W 12/0431 455/411 |
| 2013/0197998 A1* | 8/2013 | Buhrmann | H04M 1/27 726/3 |
| 2013/0204690 A1* | 8/2013 | Liebmann | G06Q 30/0225 705/14.26 |
| 2013/0208703 A1* | 8/2013 | Sugimoto | H04L 12/66 370/331 |
| 2013/0225282 A1* | 8/2013 | Williams | G07F 17/32 463/29 |
| 2013/0227711 A1* | 8/2013 | MacPherson | G06F 21/62 726/29 |
| 2013/0232543 A1* | 9/2013 | Cheng | H04L 63/20 726/1 |
| 2013/0232565 A1* | 9/2013 | O'Connor | H04L 63/0227 726/13 |
| 2013/0247159 A1* | 9/2013 | Hall | H04L 63/105 726/6 |
| 2013/0263211 A1* | 10/2013 | Neuman | G06Q 20/322 726/1 |
| 2013/0268437 A1* | 10/2013 | Desai | G06Q 20/3674 705/41 |
| 2013/0269013 A1* | 10/2013 | Parry | H04L 63/10 726/7 |
| 2013/0275308 A1* | 10/2013 | Paraskeva | G06Q 20/3224 705/44 |
| 2013/0288647 A1* | 10/2013 | Turgeman | H04W 12/30 455/411 |
| 2013/0291056 A1* | 10/2013 | Gaudet | H04L 63/0853 726/1 |
| 2013/0305325 A1* | 11/2013 | Headley | H04L 9/3215 726/5 |
| 2013/0305357 A1* | 11/2013 | Ayyagari | H04L 41/069 726/22 |
| 2013/0311372 A1* | 11/2013 | Ramaci | G07C 9/257 705/44 |
| 2013/0331027 A1* | 12/2013 | Rose | H04W 12/069 455/41.1 |
| 2013/0339185 A1* | 12/2013 | Johnson | H04L 67/104 705/26.8 |
| 2013/0340052 A1* | 12/2013 | Jakobsson | H04L 63/083 726/5 |
| 2014/0006129 A1* | 1/2014 | Heath | G06Q 30/02 705/14.23 |
| 2014/0020068 A1* | 1/2014 | Desai | G06Q 20/3227 726/4 |
| 2014/0031003 A1* | 1/2014 | Shugart | H04W 76/50 455/404.2 |
| 2014/0031011 A1* | 1/2014 | West | G06F 21/6272 455/411 |
| 2014/0031057 A1* | 1/2014 | Brassil | H04W 12/06 455/456.1 |
| 2014/0033273 A1* | 1/2014 | Rathbun | H04L 63/08 726/3 |
| 2014/0057648 A1* | 2/2014 | Lyman | H04B 7/0417 455/456.1 |
| 2014/0059347 A1* | 2/2014 | Dougherty | H04W 12/06 713/168 |
| 2014/0066101 A1* | 3/2014 | Lyman | H04L 67/52 455/456.3 |
| 2014/0067704 A1* | 3/2014 | Abhyanker | G06Q 10/1053 705/321 |
| 2014/0068723 A1* | 3/2014 | Grim | H04L 63/08 726/4 |
| 2014/0073355 A1* | 3/2014 | Ward | H04W 4/02 455/456.2 |
| 2014/0082713 A1* | 3/2014 | Markel | H04L 63/105 726/7 |
| 2014/0089185 A1* | 3/2014 | Desai | G06Q 10/067 705/41 |
| 2014/0109200 A1* | 4/2014 | Tootill | G06F 21/32 726/5 |
| 2014/0115341 A1* | 4/2014 | Robertson | G06F 21/30 713/183 |
| 2014/0141812 A1* | 5/2014 | Cho | H04W 4/029 455/456.3 |
| 2014/0143004 A1* | 5/2014 | Abhyanker | G06Q 30/02 705/7.19 |
| 2014/0155094 A1* | 6/2014 | Zises | H04W 4/08 455/456.3 |
| 2014/0157381 A1* | 6/2014 | Disraeli | H04L 63/0853 726/7 |
| 2014/0162598 A1* | 6/2014 | Villa-Real | G07F 7/0886 455/411 |
| 2014/0164154 A1* | 6/2014 | Ramaci | G06Q 20/3674 705/16 |
| 2014/0187200 A1* | 7/2014 | Reitter | H04W 4/30 455/410 |
| 2014/0189804 A1* | 7/2014 | Lehmann | G06F 21/6218 726/4 |
| 2014/0195629 A1* | 7/2014 | Abhyanker | G06Q 10/087 709/206 |
| 2014/0207672 A1* | 7/2014 | Kelley | G06Q 20/3223 705/42 |
| 2014/0208440 A1* | 7/2014 | Kelley | G06Q 20/4012 707/769 |
| 2014/0222577 A1* | 8/2014 | Abhyanker | H04L 51/222 705/14.58 |
| 2014/0229099 A1* | 8/2014 | Garrett | H04W 4/029 701/465 |
| 2014/0259129 A1* | 9/2014 | Copsey | H04L 63/08 726/5 |
| 2014/0274367 A1* | 9/2014 | Nguyen | H04W 12/082 463/29 |
| 2014/0279713 A1* | 9/2014 | Calman | G06Q 20/127 705/418 |
| 2014/0283136 A1* | 9/2014 | Dougherty | H04W 64/00 726/29 |
| 2014/0289821 A1* | 9/2014 | Wilson | G06Q 20/3278 726/5 |
| 2014/0289833 A1* | 9/2014 | Briceno | H04L 63/205 726/5 |
| 2014/0331060 A1* | 11/2014 | Hayton | G06F 21/32 713/185 |
| 2014/0348062 A1* | 11/2014 | Anwar | H04W 36/22 370/328 |
| 2014/0366128 A1* | 12/2014 | Venkateswaran | H04W 12/30 726/19 |
| 2015/0004934 A1* | 1/2015 | Qian | H04W 12/06 455/411 |

(56) References Cited

U.S. PATENT DOCUMENTS

| | | | |
|---|---|---|---|
| 2015/0024711 A1* | 1/2015 | Stob | H04W 12/068 455/411 |
| 2015/0039327 A1* | 2/2015 | Pal | G16H 10/60 705/2 |
| 2015/0065172 A1* | 3/2015 | Do | H04W 4/023 455/456.3 |
| 2015/0094860 A1* | 4/2015 | Finnerty | H04W 4/33 700/275 |
| 2015/0095223 A1* | 4/2015 | Jimenez Alamo | G06Q 20/325 705/41 |
| 2015/0103165 A1* | 4/2015 | Logvinov | H04N 7/181 348/143 |
| 2015/0111524 A1* | 4/2015 | South | G08B 25/016 455/404.2 |
| 2015/0111600 A1* | 4/2015 | Liu | H04W 64/00 455/456.1 |
| 2015/0121464 A1* | 4/2015 | Hughes, Jr. | G06F 21/31 726/4 |
| 2015/0141005 A1* | 5/2015 | Suryavanshi | H04W 12/06 455/434 |
| 2015/0142621 A1* | 5/2015 | Gray | G06Q 10/087 705/28 |
| 2015/0154597 A1* | 6/2015 | Bacastow | G06Q 20/26 705/72 |
| 2015/0156601 A1* | 6/2015 | Donnellan | H04W 12/06 455/41.1 |
| 2015/0161586 A1* | 6/2015 | Bailey | G06Q 20/405 705/44 |
| 2015/0163533 A1* | 6/2015 | Donnellan | H04N 21/41265 725/28 |
| 2015/0181382 A1* | 6/2015 | McDonald | H04W 4/021 455/456.3 |
| 2015/0199684 A1* | 7/2015 | Maus | H04L 67/12 705/71 |
| 2015/0227727 A1* | 8/2015 | Grigg | H04W 12/63 726/4 |
| 2015/0227728 A1* | 8/2015 | Grigg | H04W 4/029 726/4 |
| 2015/0229623 A1* | 8/2015 | Grigg | H04W 12/64 726/7 |
| 2015/0229650 A1* | 8/2015 | Grigg | G06F 21/316 726/7 |
| 2015/0234767 A1* | 8/2015 | Tatge | G06F 13/4282 710/306 |
| 2015/0237475 A1* | 8/2015 | Henson | H04W 4/021 455/456.3 |
| 2015/0242605 A1* | 8/2015 | Du | G06F 21/32 726/7 |
| 2015/0244699 A1* | 8/2015 | Hessler | H04W 12/062 726/7 |
| 2015/0257004 A1* | 9/2015 | Shanmugam | H04W 12/065 455/411 |
| 2015/0264572 A1* | 9/2015 | Turgeman | G06F 3/038 455/411 |
| 2015/0264573 A1* | 9/2015 | Giordano | H04L 63/107 726/7 |
| 2015/0281955 A1* | 10/2015 | Zhang | H04W 4/021 726/4 |
| 2015/0302398 A1* | 10/2015 | Desai | G06Q 20/322 705/41 |
| 2015/0304920 A1* | 10/2015 | Cootey | H04W 28/18 455/436 |
| 2015/0319174 A1* | 11/2015 | Hayton | H04L 63/0884 726/7 |
| 2015/0324943 A1* | 11/2015 | Han | G06Q 10/105 705/2 |
| 2015/0334245 A1* | 11/2015 | Lin | H04W 4/80 370/261 |
| 2015/0350140 A1* | 12/2015 | Garcia | H04L 51/043 715/753 |
| 2015/0358790 A1* | 12/2015 | Nasserbakht | G06F 21/32 726/19 |
| 2015/0371303 A1* | 12/2015 | Suri | H04W 4/023 705/26.41 |
| 2015/0379284 A1* | 12/2015 | Stuntebeck | G06Q 10/107 726/30 |
| 2015/0381598 A1* | 12/2015 | Koved | H04W 12/065 726/3 |
| 2015/0381602 A1* | 12/2015 | Grim | H04W 12/30 726/4 |
| 2015/0381621 A1* | 12/2015 | Innes | H04W 12/069 726/7 |
| 2015/0381633 A1* | 12/2015 | Grim | H04L 63/0861 726/4 |
| 2015/0382195 A1* | 12/2015 | Grim | H04W 12/06 726/4 |
| 2016/0005126 A1* | 1/2016 | Ghosh | G06Q 40/06 705/36 R |
| 2016/0019547 A1* | 1/2016 | Gurnani | G06Q 20/40 705/44 |
| 2016/0019574 A1* | 1/2016 | Herkert | G06Q 30/0221 705/14.26 |
| 2016/0021081 A1* | 1/2016 | Caceres | G06F 21/32 726/7 |
| 2016/0027013 A1* | 1/2016 | Modi | G06Q 20/203 705/65 |
| 2016/0035159 A1* | 2/2016 | Ganapathy Achari | H04L 9/3213 340/5.61 |
| 2016/0042485 A1* | 2/2016 | Kopel | G06Q 30/0241 705/13 |
| 2016/0048846 A1* | 2/2016 | Douglas | G06F 16/23 705/318 |
| 2016/0055690 A1* | 2/2016 | Raina | H04W 40/244 340/5.61 |
| 2016/0056964 A1* | 2/2016 | Andiappan | H04L 9/3263 713/189 |
| 2016/0063235 A1* | 3/2016 | Tussy | G06Q 20/3276 726/6 |
| 2016/0063503 A1* | 3/2016 | Kobres | G06Q 20/40 705/18 |
| 2016/0073261 A1* | 3/2016 | Hughes, Jr. | H04W 4/021 455/411 |
| 2016/0080486 A1* | 3/2016 | Ram | H04L 12/1822 709/205 |
| 2016/0087952 A1* | 3/2016 | Tartz | H04W 12/06 455/411 |
| 2016/0092875 A1* | 3/2016 | Howe | G06Q 20/42 705/44 |
| 2016/0110744 A1* | 4/2016 | Nicholson | H04W 4/021 705/7.34 |
| 2016/0112397 A1* | 4/2016 | Mankovskii | H04L 63/105 726/6 |
| 2016/0112871 A1* | 4/2016 | White | H04W 12/06 726/4 |
| 2016/0132851 A1* | 5/2016 | Desai | H04W 12/06 705/21 |
| 2016/0132879 A1* | 5/2016 | Howe | G06Q 20/405 705/44 |
| 2016/0134596 A1* | 5/2016 | Kovacs | H04L 63/0876 726/7 |
| 2016/0134624 A1* | 5/2016 | Jacobson | H04L 63/168 726/4 |
| 2016/0135046 A1* | 5/2016 | John Archibald | H04L 63/0861 455/411 |
| 2016/0148092 A1* | 5/2016 | Chauhan | G06Q 30/0205 706/46 |
| 2016/0171499 A1* | 6/2016 | Meredith | G06Q 20/4016 705/44 |
| 2016/0183166 A1* | 6/2016 | Chen | H04W 48/02 455/435.1 |
| 2016/0188602 A1* | 6/2016 | Glover | G06F 16/9537 707/749 |
| 2016/0189147 A1* | 6/2016 | Vanczak | H04L 63/0838 705/71 |
| 2016/0189151 A1* | 6/2016 | He | G06Q 20/401 705/75 |

(56) References Cited

U.S. PATENT DOCUMENTS

| | | | |
|---|---|---|---|
| 2016/0197909 A1* | 7/2016 | Innes | H04W 12/06 726/6 |
| 2016/0205094 A1* | 7/2016 | Harthattu | H04W 12/065 455/411 |
| 2016/0212113 A1* | 7/2016 | Banerjee | H04W 12/06 |
| 2016/0212132 A1* | 7/2016 | Banerjee | H04W 12/082 |
| 2016/0223998 A1* | 8/2016 | Songkakul | G05B 15/02 |
| 2016/0231014 A1* | 8/2016 | Ro | F24F 11/62 |
| 2016/0232878 A1* | 8/2016 | Chen | G06F 3/165 |
| 2016/0255097 A1* | 9/2016 | Smith | H04L 63/107 726/1 |
| 2016/0261658 A1* | 9/2016 | Taylor | H04L 65/612 |
| 2016/0262681 A1* | 9/2016 | Patterson | A61B 5/165 |
| 2016/0306813 A1* | 10/2016 | Meredith | H04W 4/029 |
| 2016/0307447 A1* | 10/2016 | Johnson | H04W 4/021 |
| 2016/0308858 A1* | 10/2016 | Nordstrom | H04L 9/3228 |
| 2016/0337346 A1* | 11/2016 | Momchilov | G06F 21/34 |
| 2016/0337403 A1* | 11/2016 | Stoops | H04W 12/065 |
| 2016/0345148 A1* | 11/2016 | Johnson | H04W 4/14 |
| 2016/0345176 A1* | 11/2016 | DeWitt | H04W 4/029 |
| 2016/0350818 A1* | 12/2016 | Saeed | G06Q 30/0643 |
| 2016/0358145 A1* | 12/2016 | Montgomery | G06Q 20/36 |
| 2016/0364790 A1* | 12/2016 | Lanpher | H04L 63/107 |
| 2016/0366199 A1* | 12/2016 | Shaw | H04L 65/612 |
| 2016/0366589 A1* | 12/2016 | Jean | H04L 63/0892 |
| 2016/0371683 A1* | 12/2016 | Maus | G06Q 20/3226 |
| 2016/0381552 A1* | 12/2016 | Jakobsson | H04W 12/06 455/411 |
| 2017/0003938 A1* | 1/2017 | Gulkis | G06F 9/45525 |
| 2017/0006013 A1* | 1/2017 | Mande | G07F 9/026 |
| 2017/0006114 A1* | 1/2017 | Mande | G06Q 20/1085 |
| 2017/0017810 A1* | 1/2017 | Bolotin | G06F 21/6218 |
| 2017/0032114 A1* | 2/2017 | Turgeman | H04W 12/06 |
| 2017/0041296 A1* | 2/2017 | Ford | G06F 21/64 |
| 2017/0076265 A1* | 3/2017 | Royyuru | G06Q 20/18 |
| 2017/0078851 A1* | 3/2017 | Agrawal | G01S 5/02524 |
| 2017/0078877 A1* | 3/2017 | Chudy | H04W 12/06 |
| 2017/0085563 A1* | 3/2017 | Royyuru | G06Q 20/12 |
| 2017/0094509 A1* | 3/2017 | Mistry | H04W 4/50 |
| 2017/0098065 A1* | 4/2017 | Vaughn | G06F 21/316 |
| 2017/0126649 A1* | 5/2017 | Votaw | H04L 63/0815 |
| 2017/0126672 A1* | 5/2017 | Jang | H04L 63/0492 |
| 2017/0140663 A1* | 5/2017 | Sadeh-Koniecpol | G09B 19/0053 |
| 2017/0141925 A1* | 5/2017 | Camenisch | H04L 63/0823 |
| 2017/0148009 A1* | 5/2017 | Perez Lafuente | H04L 63/20 |
| 2017/0171717 A1* | 6/2017 | Shulman | G08B 21/22 |
| 2017/0180339 A1* | 6/2017 | Cheng | G06F 21/31 |
| 2017/0180361 A1* | 6/2017 | Sampas | H04N 5/33 |
| 2017/0187210 A1* | 6/2017 | Cogill | H04W 4/029 |
| 2017/0193501 A1* | 7/2017 | Cole | G06Q 20/326 |
| 2017/0195307 A1* | 7/2017 | Jones-McFadden | H04W 12/06 |
| 2017/0199046 A1* | 7/2017 | Lee | G01C 21/3697 |
| 2017/0208435 A1* | 7/2017 | Jordan | G01S 5/0027 |
| 2017/0213050 A1* | 7/2017 | Ramaci | H04L 63/0861 |
| 2017/0250979 A1* | 8/2017 | Benson | H04L 67/303 |
| 2017/0279733 A1* | 9/2017 | Marshall | H04L 47/70 |
| 2017/0289813 A1* | 10/2017 | Pashkov | H04L 63/083 |
| 2017/0316677 A1* | 11/2017 | Messier | G08B 21/0461 |
| 2017/0317824 A1* | 11/2017 | Brown | H04L 9/0894 |
| 2017/0330460 A1* | 11/2017 | Massey | G08G 1/146 |
| 2017/0347388 A1* | 11/2017 | Cai | H04W 76/15 |
| 2017/0364871 A1* | 12/2017 | Kurian | H04L 63/105 |
| 2018/0007059 A1* | 1/2018 | Innes | G06F 21/6218 |
| 2018/0007060 A1* | 1/2018 | Leblang | H04L 63/107 |
| 2018/0007553 A1* | 1/2018 | Dutt | H04W 12/06 |
| 2018/0012222 A1* | 1/2018 | Berger | G06Q 20/3223 |
| 2018/0019986 A1* | 1/2018 | Manohar | H04W 12/06 |
| 2018/0027411 A1* | 1/2018 | Taneja | H04L 63/107 726/9 |
| 2018/0041518 A1* | 2/2018 | Jacobs | H04W 12/06 |
| 2018/0063125 A1* | 3/2018 | Bryant | H04L 63/0838 |
| 2018/0068567 A1* | 3/2018 | Gong | G05D 1/106 |
| 2018/0083981 A1* | 3/2018 | Arunkumar | H04L 67/10 |
| 2018/0089916 A1* | 3/2018 | Drako | G07C 9/00571 |
| 2018/0103025 A1* | 4/2018 | Lyman | H04W 4/80 |
| 2018/0103341 A1* | 4/2018 | Moiyallah, Jr. | G06F 3/04842 |
| 2018/0115897 A1* | 4/2018 | Einberg | H04W 12/04 |
| 2018/0121150 A1* | 5/2018 | Lin | H04M 3/563 |
| 2018/0139206 A1* | 5/2018 | Ezell | H04L 63/0861 |
| 2018/0158061 A1* | 6/2018 | Edelstein | H04W 12/06 |
| 2018/0173933 A1* | 6/2018 | Gousev | G06V 40/193 |
| 2018/0173948 A1* | 6/2018 | Gousev | G06F 1/3203 |
| 2018/0173986 A1* | 6/2018 | Gousev | G06V 40/193 |
| 2018/0176880 A1* | 6/2018 | Kummetz | H04W 64/003 |
| 2018/0199200 A1* | 7/2018 | Wang | H04L 63/083 |
| 2018/0206083 A1* | 7/2018 | Kumar | H04W 4/33 |
| 2018/0225671 A1* | 8/2018 | Brown | H04L 63/0861 |
| 2018/0232718 A1* | 8/2018 | Brown | G06Q 20/363 |
| 2018/0232740 A1* | 8/2018 | Brown | G06F 21/32 |
| 2018/0248892 A1* | 8/2018 | Hefetz | H04W 12/06 |
| 2018/0262907 A1* | 9/2018 | Alanis | H04W 12/64 |
| 2018/0268476 A1* | 9/2018 | Brown | G06Q 30/08 |
| 2018/0270611 A1* | 9/2018 | Jones | B64C 39/024 |
| 2018/0295514 A1* | 10/2018 | Brown | H04W 12/069 |
| 2018/0330597 A1* | 11/2018 | Burke | G08B 25/008 |
| 2018/0330599 A1* | 11/2018 | Burke | G08B 25/008 |
| 2018/0336327 A1* | 11/2018 | Wallace | G06Q 20/351 |
| 2018/0350144 A1* | 12/2018 | Rathod | G06Q 20/3224 |
| 2018/0351956 A1* | 12/2018 | Verma | H04W 12/08 |
| 2018/0352386 A1* | 12/2018 | Gunasekara | H04W 4/33 |
| 2018/0357406 A1* | 12/2018 | Bolotin | H04L 9/002 |
| 2018/0357407 A1* | 12/2018 | Yous | G06F 16/29 |
| 2018/0357848 A1* | 12/2018 | Mclellan | G06Q 10/083 |
| 2018/0359369 A1* | 12/2018 | Golshenas | H04W 4/14 |
| 2018/0372878 A1* | 12/2018 | Syrjarinne | H04L 9/3297 |
| 2019/0007203 A1* | 1/2019 | Bolotin | G06F 21/602 |
| 2019/0026991 A1* | 1/2019 | Torres | G07F 17/3276 |
| 2019/0035190 A1* | 1/2019 | Szczygiel | G07C 9/00309 |
| 2019/0041822 A1* | 2/2019 | Burke | G05B 19/0428 |
| 2019/0043281 A1* | 2/2019 | Aman | G07C 9/215 |
| 2019/0058700 A1* | 2/2019 | Kurian | H04W 12/065 |
| 2019/0058706 A1* | 2/2019 | Feijoo | G06F 21/335 |
| 2019/0065724 A1* | 2/2019 | Dudley | G06F 21/35 |
| 2019/0068373 A1* | 2/2019 | Konduru | H04L 63/0853 |
| 2019/0082293 A1* | 3/2019 | Rifkin | G06F 16/955 |
| 2019/0096266 A1* | 3/2019 | Liu | G08G 5/0069 |
| 2019/0109840 A1* | 4/2019 | Thompson | H04W 12/06 |
| 2019/0110198 A1* | 4/2019 | LeCun | H04N 19/70 |
| 2019/0114404 A1* | 4/2019 | Nowak | H04W 12/06 |
| 2019/0132306 A1* | 5/2019 | Avni | G06Q 50/01 |
| 2019/0139024 A1* | 5/2019 | Bakshi | H04W 12/72 |
| 2019/0141031 A1* | 5/2019 | Devdas | H04L 63/18 |
| 2019/0149539 A1* | 5/2019 | Scruby | H04L 63/0838 713/168 |
| 2019/0171178 A1* | 6/2019 | Burke | G05B 19/0428 |
| 2019/0188961 A1* | 6/2019 | Higgins | G07F 17/3251 |
| 2019/0205716 A1* | 7/2019 | Moshkovitz | G16H 40/67 |
| 2019/0213311 A1* | 7/2019 | Tussy | G06V 10/17 |
| 2019/0213312 A1* | 7/2019 | Tussy | G06Q 20/3276 |
| 2019/0222570 A1* | 7/2019 | Krishan | G06F 21/45 |
| 2019/0238532 A1* | 8/2019 | Alexander | H04L 9/08 |
| 2019/0251544 A1* | 8/2019 | D'Agostino | G06Q 20/3224 |
| 2019/0253836 A1* | 8/2019 | Sinha | H04W 8/04 |
| 2019/0272025 A1* | 9/2019 | Turgeman | G06F 3/04812 |
| 2019/0274086 A1* | 9/2019 | Cui | H04W 4/70 |
| 2019/0281053 A1* | 9/2019 | Brown | H04W 12/06 |
| 2019/0281573 A1* | 9/2019 | Tyagi | G06K 19/0723 |
| 2019/0302221 A1* | 10/2019 | Sheng | G01S 5/0242 |
| 2019/0306781 A1* | 10/2019 | Do | H04W 4/021 |
| 2019/0311102 A1* | 10/2019 | Tussy | G06V 40/67 |
| 2019/0311472 A1* | 10/2019 | Harrup | G06T 7/0004 |
| 2019/0319987 A1* | 10/2019 | Levy | H04L 9/50 |
| 2019/0327217 A1* | 10/2019 | Leon | H04L 63/083 |
| 2019/0327227 A1* | 10/2019 | Tobkes | H04L 67/52 |
| 2019/0340876 A1* | 11/2019 | Northrup | G07F 17/3241 |
| 2019/0342329 A1* | 11/2019 | Turgeman | G06F 3/0488 |
| 2019/0361430 A1* | 11/2019 | Nelson | G05D 1/0022 |
| 2019/0364043 A1* | 11/2019 | Nelson | H04L 63/105 |
| 2019/0372989 A1* | 12/2019 | Shultz | G06F 21/41 |
| 2020/0004939 A1* | 1/2020 | Streit | H04L 63/0861 |
| 2020/0026840 A1* | 1/2020 | Pathak | H04W 12/06 |

(56) References Cited

U.S. PATENT DOCUMENTS

| | | | |
|---|---|---|---|
| 2020/0034521 A1* | 1/2020 | Teng | H04L 63/083 |
| 2020/0042685 A1* | 2/2020 | Tussy | H04L 63/0861 |
| 2020/0053075 A1* | 2/2020 | Eramian | H04W 4/02 |
| 2020/0065459 A1* | 2/2020 | Himabindu | G06F 21/316 |
| 2020/0067907 A1* | 2/2020 | Avetisov | H04L 63/12 |
| 2020/0148348 A1* | 5/2020 | Bradley | B64U 10/13 |
| 2020/0169834 A1* | 5/2020 | Dromerhauser | G06Q 10/02 |
| 2020/0178075 A1* | 6/2020 | Daniel | H04L 9/3239 |
| 2020/0193368 A1* | 6/2020 | Bhatia | B60R 25/25 |
| 2020/0204999 A1* | 6/2020 | Daniel | H04L 9/3247 |
| 2020/0205000 A1* | 6/2020 | Daniel | H04W 12/08 |
| 2020/0211358 A1* | 7/2020 | Burke | G08B 21/043 |
| 2020/0242222 A1* | 7/2020 | Machani | G06F 21/45 |
| 2020/0244464 A1* | 7/2020 | McLean | H04L 9/0618 |
| 2020/0275271 A1* | 8/2020 | Saripalle | H04W 12/065 |
| 2020/0288308 A1* | 9/2020 | Jimenez | H04W 12/71 |
| 2020/0296590 A1* | 9/2020 | Soryal | H04W 12/63 |
| 2020/0329334 A1* | 10/2020 | Kurian | H04W 4/021 |
| 2020/0347643 A1* | 11/2020 | Burke | E05B 47/02 |
| 2020/0360826 A1* | 11/2020 | Schmidt | E04H 3/10 |
| 2020/0402052 A1* | 12/2020 | Sloane | H04L 63/105 |
| 2020/0403992 A1* | 12/2020 | Huffman | G06F 21/6263 |
| 2020/0410832 A1* | 12/2020 | Szczygiel | G07C 9/29 |
| 2021/0029546 A1* | 1/2021 | Maufort | H04W 12/06 |
| 2021/0037010 A1* | 2/2021 | Koshy | H04L 41/082 |
| 2021/0044976 A1* | 2/2021 | Avetisov | H04L 63/0815 |
| 2021/0058383 A1* | 2/2021 | Colon | H04W 4/029 |
| 2021/0182440 A1* | 6/2021 | Singh | G06F 21/6245 |
| 2021/0243782 A1* | 8/2021 | Miao | H04L 5/0091 |
| 2021/0274412 A1* | 9/2021 | Dowlatkhah | H04W 36/32 |
| 2021/0302167 A1* | 9/2021 | Crolley | G01S 19/45 |
| 2021/0342784 A1* | 11/2021 | Soldo | G06Q 10/105 |
| 2021/0357907 A1* | 11/2021 | Shpak | H04W 4/025 |
| 2022/0012740 A1* | 1/2022 | Bacastow | G06Q 20/322 |
| 2022/0024494 A1* | 1/2022 | Bonanni | G01C 21/3453 |
| 2022/0131871 A1* | 4/2022 | Huang | H04W 12/06 |
| 2022/0139167 A1* | 5/2022 | Weaver | G07F 17/3267 463/19 |
| 2022/0141620 A1* | 5/2022 | Sullivan | H04W 8/08 455/456.1 |
| 2022/0158997 A1* | 5/2022 | Guinard | H04L 63/0853 |
| 2022/0188443 A1* | 6/2022 | Shaw | G06F 21/602 |
| 2022/0255931 A1* | 8/2022 | Avetisov | H04L 9/3263 |
| 2022/0292543 A1* | 9/2022 | Henderson | G06Q 30/0252 |
| 2022/0296999 A1* | 9/2022 | Amaitis | A63F 13/73 |
| 2023/0051473 A1* | 2/2023 | Wallace | H04W 8/24 |
| 2023/0123475 A1* | 4/2023 | Johnson | H04L 63/1466 726/2 |
| 2023/0232217 A1* | 7/2023 | Rosencrantz | H04W 12/72 726/6 |
| 2023/0285852 A1* | 9/2023 | Amaitis | G07F 17/3237 726/2 |
| 2023/0308460 A1* | 9/2023 | Thomas | H04L 63/08 726/23 |
| 2023/0353977 A1* | 11/2023 | Griesmer | H04W 4/24 |

OTHER PUBLICATIONS

Zhang et al "Location-based Authentication and Authorization Using Smart Phones," 2012 IEEE 11th International Conference on Trust, Security and Privacy in Computing and Communications, IEEE Computer Society, pp. 1285-1292 (Year: 2012).*

El-Sobhy et al "Proximity-basd Services in Mobile Cloud Scenarios Using Extended Communications Models," 2015 IEEE 4th International Conference on Cloud Networking (CloudNet), pp. 125-131 (Year: 2015).*

Park et al "TGVisor: A Tiny Hypervisor-Based Trusted Geolocation Framework for Mobile Cloud Clients," 2015 3rd IEEE International Conference on Mobile Cloud Computing, Services, and Engineering, IEEE Computer Society, pp. 99-108 (Year: 2015).*

Shivhare et al "A Study on Geo-Location Authentication Techniques," 2014 Sixth International Conference on Computational Intelligence and Communication Networks, IEEE Computer Society, pp. 744-748 (Year: 2014).*

Zhang et al "Location-Based Authentication and Authorization Using Smart Phones," 2012 IEEE 11th International Conference on Trust, Security and Privacy in Computing and Communication, IEEE Computer Society, pp. 1285-1292 (Year: 2012).*

Ghogare et al "Location Based Authentication: A New Approach towards Providing Security," International Journal of Scientific and Research Publications, vol. 2, Issue 4, Apr. 2012, pp. 1-5 (Year: 2012).*

Fridman et al Active Authentication on Mobile Devices via Stylometry, Application Usage, Web Browsing and GPS Location, pp. 1-10 (Year: 2015).*

* cited by examiner

LOCATION-BASED MOBILE DEVICE AUTHENTICATION

CROSS-REFERENCE TO RELATED APPLICATION

This is a continuation of U.S. Ser. No. 16/998,030 (allowed), filed Aug. 20, 2020 and titled "Location-Based Mobile Device Authentication," which claims priority to U.S. Provisional Ser. No. 62/889,731, filed Aug. 21, 2019 and titled "Location-Based Mobile Device Authentication," each of which is hereby incorporated by reference in its entirety for all purposes.

TECHNICAL FIELD

The present disclosure relates generally to user and device authentication within computer systems, and more particularly, to mobile device location tracking and location-based authentication techniques for providing access to secure server resources and applications.

BACKGROUND

Authentication is a function of modern-day computer systems that can be used for a wide variety of applications. For example, users may request to access bank accounts, tax records, or other secure, confidential information from mobile computing devices. Due to the confidential nature of the information requested, the user may be authenticated before being granted access to the information. Authentication may involve determining the user is an owner of the information or is entitled to access the information.

Authentication has historically involved passwords. The owner of the information may set up a password-protected account that may include confidential information with a service provider. The user may, at a later point, attempt to access the account to view the confidential information, and the service provider may authenticate the user, based on a successful password input from the user, and allow the user to view the confidential information. Two-factor authentication, in which two authentication methods are involved, can provide extra security for confidential information. But, in our modern world, users may desire authentication methods that may be quicker and more secure than existing technologies.

SUMMARY

In some examples, a computer server is disclosed that may include a processing unit and a computer-readable memory that may store computer-executable instructions that are executable by the processing unit to cause the computer server to perform various operations. The computer server may receive location data from a mobile client device and may compare the location data to predefined secure location definitions, which may be trusted or private locations. The computer server may receive a request from the mobile client device to access network resources or services, and the computer server may determine, using a result of comparing the location data and the one or more predefined secure location definitions, an authentication process for providing the mobile client device with access to the network resources or services. The computer server may execute the authentication process and may provide the mobile client device with access to the network resources or services.

In other examples, a method is disclosed for authenticating a user with location-based authentication. Location data may be received from a mobile client device, and the location data may be compared to one or more predefined secure location definitions associated with the mobile client device. The one or more predefined secure location definitions may include locations that are private or trusted for the mobile client device. A request from the mobile client device may be received to access network resources or services provided by a computer server. In response to receiving the request, an authentication process may be selected, using a result of comparing the location data and the one or more predefined secure location definitions associated with the mobile client device, from among a plurality of authentication processes for providing the mobile client device with access to the network resources or services. The authentication process for providing the mobile client device with access to the network resources or services may be executed, and the mobile client device may be provided with access to the network resources or services in response to successfully authenticating the mobile client device.

In other examples, a non-transitory computer-readable medium is disclosed that may include instructions that are executable by a processing device for causing the processing device to perform various operations. The processing device may receive location data from a mobile client device. The processing device may compare the location data to one or more predefined secure location definitions associated with the mobile client device. The one or more predefined secure location definitions may include locations that are private or trusted for the mobile client device. The processing device may receive a request from the mobile client device to access one or more network resources or services provided by a computer server. In response to the request from the mobile client device, the processing device may determine, using a result of comparing the location data and the one or more predefined secure location definitions associated with the mobile client device, an authentication process for providing the mobile client device with access to the network resources or services. The processing device may execute the authentication process for providing the mobile client device with access to the network resources or services and may, in response to successfully authenticating the mobile client device, provide the mobile client device with access to the network resources or services.

DETAILED DESCRIPTION

Figure 1:
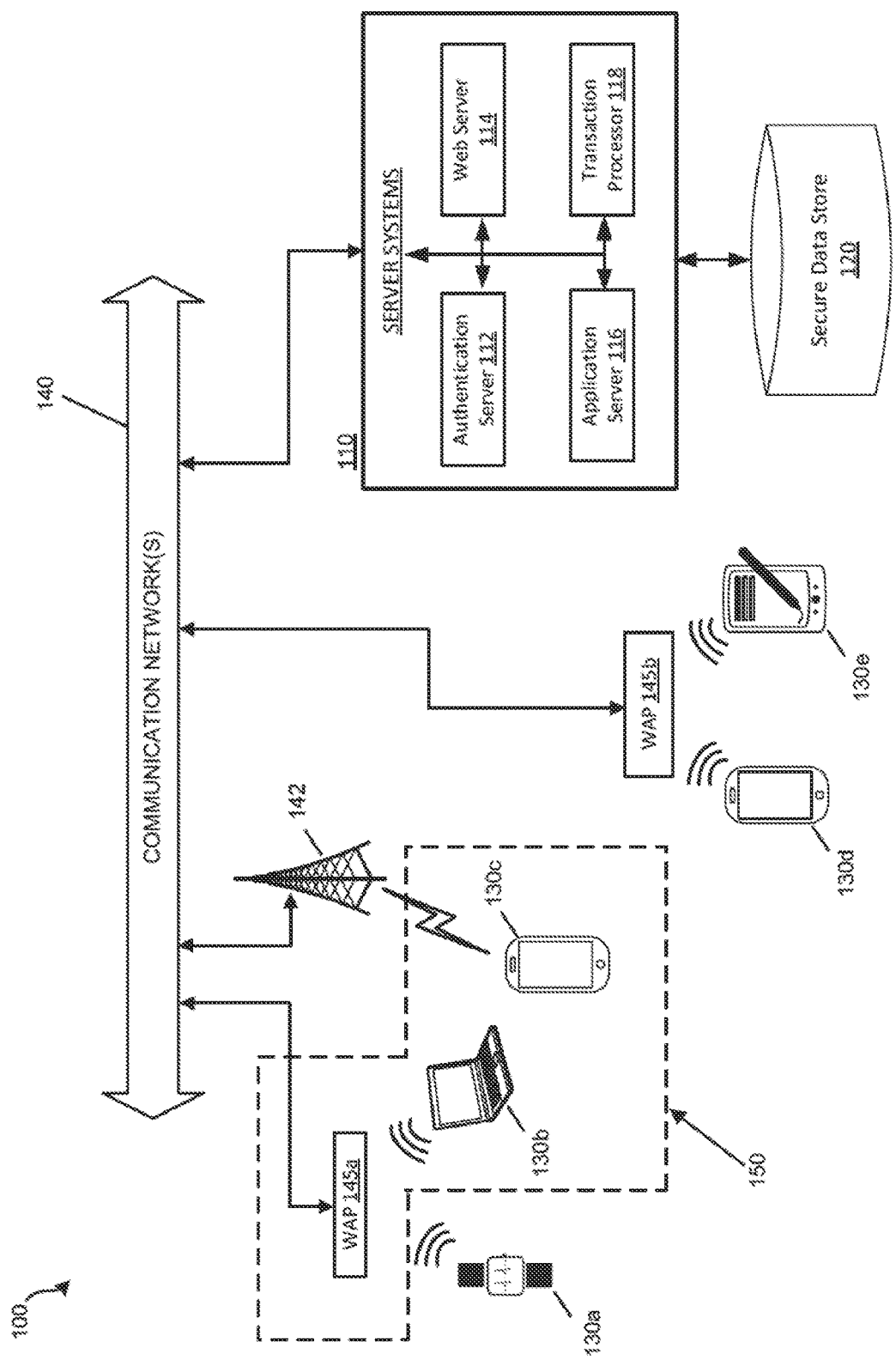
FIG. 1 is a schematic of a network environment in which locations can be used to authenticate users and automatically navigate to desired pages for the users, according to one aspect of the present disclosure.

Certain aspects and features described herein relate to location tracking and location-based authentication of mobile devices by authentication systems providing access to various network resources or services. One or more secure location definitions may be predefined for a particular mobile device and stored by an authentication system. These predefined location definitions for a mobile device may correspond to locations that may be considered private, secure, safe, or trusted for that particular mobile device, such as the home, workplace, or vehicle of the mobile device's owner, or any other locations considered trusted, secure, private, or safe for that mobile device. Secure location definitions for a mobile device may, for example, correspond to predefined geofences defining a virtual boundary based on geographic coordinates of the mobile device, or may correspond to a predefined trusted wireless access point or other network identifiers that indicate that the mobile device is being operated at a safe and trusted location.

An authentication system associated with one or more mobile applications (or web-based resources or services) may receive and store location data from a mobile device, for example, the device's GPS coordinates, network component identifiers through which the mobile device is connecting to the system, or identifiers of computing devices nearby to the mobile device. In some embodiments, a mobile device's location may be continuously (or periodically) tracked and stored by the authentication system. When the mobile device attempts to open a particular mobile application (or other web-based resources or services), the authentication system may compare the mobile device's location data to the predefined secure location definitions associated with the mobile device. Based on the results of the comparison, the authentication may determine and execute an authentication process for the mobile device before permitting the mobile device to access the requested mobile application (or other web-based resources or services). For example, if a mobile device attempts to open a secure mobile application (or other web-based resources or services) while the mobile device is located within one of the predefined secure locations associated with the mobile device, then the authentication system may immediately authenticate the mobile device to open and access the secure mobile application (or other web-based resources or services) without requiring any additional authentication techniques. In contrast, if the mobile device is located outside of the predefined secure locations when attempting to open the secure mobile application (or other web-based resources or services), the authentication system may require the mobile device to complete additional authentication steps before accessing the secure mobile application (or other web-based resources or services).

In some examples, a user of the mobile device may request access to a mobile application (or other web-based resources or services) from a computer server via the mobile device. The computer server may include a set of locations that may be designated as predefined secure locations. The predefined secure locations may be previously received from the user via the mobile device, and the computer server can provide to the user recommendations or suggestions of predefined secure locations. The recommendations or suggestions may be locations frequented by the user or any suitable location that may be considered safe, secure, trusted, or private. Locations may be designated as predefined secure locations by the user of the mobile device, and the computer server may receive the locations from the user.

In other examples, the computer server or the mobile device may store a predefined list of secure wireless access points. The secure wireless access points may be associated with the mobile device and may be considered safe, secure, trusted, or private. If the user requests access to a mobile application (or other web-based resources or services) via a secure wireless access point that is included in the predefined list of secure wireless access points, the user may be immediately authenticated and may avoid subsequent authentication steps.

In the following description, for the purposes of explanation, specific details are set forth in order to provide a thorough understanding of various implementations and examples. Various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

FIG. 1 is a schematic of a network environment 100 in which locations of mobile devices can be tracked and used to authenticate the devices and provide the devices with access to secure network resources according to aspects of the present disclosure. Included in the network environment 100 are mobile devices 130, one or more communication networks 140, and a server system 110. The mobile devices 130 may request and access resources within the server system 110, over one or more communications networks 140, via wireless access points 145 or other network components. The network environment 100 may correspond to a Wide Area Network ("WAN") environment, such as the Internet, through which mobile devices 130 may communicate with servers via web browsers or client-side applications, to establish communication sessions, request and receive web-based resources, and access other features (e.g., applications or services) provided by one or more backend server systems 110.

The server system 110 may be communicatively coupled to a data store 120 through one or more networks. Server system 110 may be or include any type of server including, for example, a rack server, a tower server, a miniature server, a blade server, a mini rack server, a mobile server, an ultra-dense server, a super server, or the like. The server system 110 also may include various hardware components, for example, a motherboard, a processing units, memory systems, hard drives, network interfaces, power supplies, etc. Server system 110 may include one or more server farms, clusters, or any other appropriate arrangement or combination of computer servers. Additionally, server system 110 may act according to stored instructions located in a memory subsystem of the server system 110, and may execute an operating system or other applications.

The server system 110 may implement several different applications and services, and perform additional server-side functionality, including by an authentication server 112, web server 114, application server 116, and a backend transaction processor 118. For example, in implementations of banking or financial services systems, electronic commerce systems, and the like, the web-based resources provided by web server 114 or applications supported by application server 116 may be used by mobile devices 130 to access account information and perform application functions related to multiple accounts. The data store 120 may store any information necessary for the server system 110 to implement any functions of an application in relation to account access and permissions. In some examples, the server system 110 and data store 120 can be a single computing device that implements an application and stores user account information.

The data store 120 can include a profile of the known devices and behaviors of each user for each account provided by a certain application. For example, a single user may have two accounts for a particular application. The user may typically use a desktop computer to access information related to a first account, while more often use a mobile device 130 to access information related to the second account. The data store 120 may record these user activity observations over time as a user profile for the server system 110 to use in determining if any anomalous behavior occurs during further login attempts. For example, if the user attempts to access the first account using the mobile device, the confidence score of the successful login, as determined by the server system 110, may be of a lower score than what would typically be given to the user. The data store 120 also may include a set of defined rules configurable by the user or entity providing the account services. As another example, an entity maintaining the server system 110 and data store 120 may establish broad rules across user accounts that involve additional user verification when a confidence score is below a threshold value.

The mobile devices 130, which can be any number, can be capable of accessing and establishing communication sessions with the server system 110 and the data store 120 through the communication networks 140. As shown in this example, mobile devices 130a-130d correspond computing devices such as laptops 130a, tablet computers 130b, smartphones 130c, and smart watches 130d. Mobile devices 130 may access the server system 110 via one or more wireless access points 145 or other communication network components. Wireless access points 145 can include devices such as wireless routers, modems, switches, mobile hotspots, set-top boxes, and the like, which allow mobile devices 130 to connect and communicate wirelessly to Local Area Networks ("LANs"), Wide Area Networks (WANs), as well as mobile telecommunication networks, short-range wireless networks, or various other communication network types (e.g., cable or satellite networks). A mobile device 130 may connect to a wireless access point 145 using radio frequency (RF) signals transmitted between the wireless communication antenna(s) on both devices, or other wireless communication technologies. Additionally, as shown in FIG. 1, certain mobile devices 130 need not use a wireless access point 145 to access the server system 110, but may access the server system via a cellular telecommunications network having one or more wireless base stations 142. In other examples, mobile devices 130 may be configured to access the server system 110 though cable networks, satellite networks, or other communication networks using separate network components and technologies.

Users operating various mobile devices 130 may attempt to gain access to the various resources provided by server system 110, including the server-side data, features, and functionality provided by secure mobile applications executing on mobile devices 130. A user also may use a browser application on a mobile device 130 to access secure web-based resources and services from the server system 110, as well as data from the underlying data stores 120 maintained by the server system 110. In response to requests from mobile devices 130, the authentication server 112 may attempt with verify the current user of the mobile device 130 with a sufficient degree of confidence, and that the current user has sufficient authorization credentials to retrieve the requested resources or perform the requested functionality.

Although certain network components are shown in FIG. 1, any number of compatible network hardware components and network architecture designs may be implemented in various embodiments to support communication between the server system 110, data store 120, and various mobile devices 130. Such communication network(s) may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth™, Near Field Communication (NFC), and the like. By way of example, the network(s) connecting the mobile devices 130 and server system 110 in FIG. 1 may be local area networks (LANs), such as one based on Ethernet, Token-Ring or the like. Such network(s) also may be wide-area networks, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
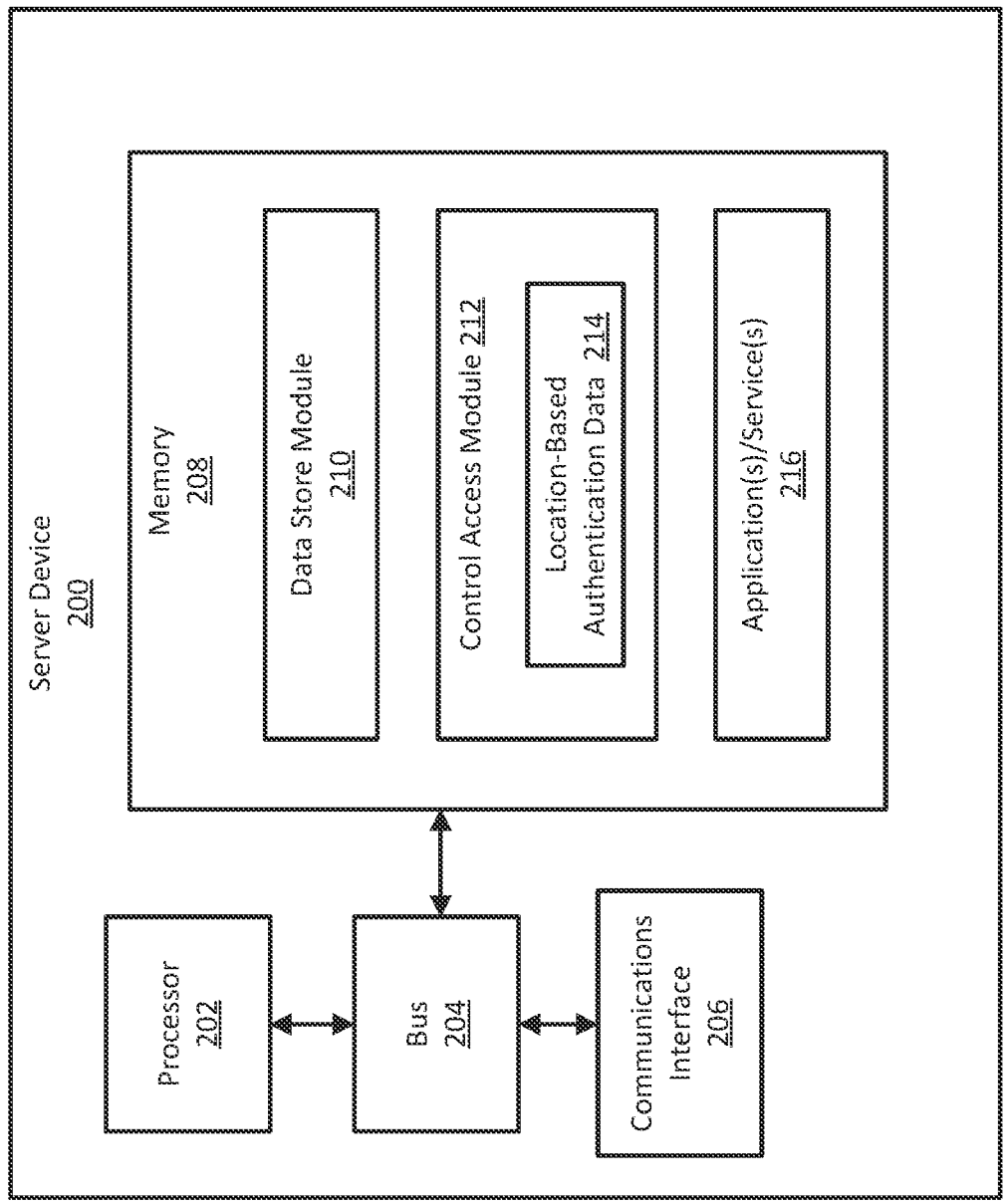
FIG. 2 is a block diagram of an example of a server device configured to execute programming code to authenticate users and provide direct and targeted access to specific pages using locations, according to one example of the present disclosure.

FIG. 2 is a block diagram of an example of a server device 200 configured to receive location data and track locations of mobile devices 130, and to provide location-based authentication of the mobile devices 130 for providing access to secure resources or services, according to one example of the present disclosure. Authenticating user requests from mobile devices 130, and providing access to requested secure resources or services, can be based on tracking or determining the location of the mobile device 130 from which a request was received, and comparing the location to location-based authentication data stored in the server device 200. In this example, the server device 200 may be used as the entire server system 110, the authentication server 112, or any combination of servers, systems, and data stores 112-120 from FIG. 1.

The server device 200 may be a network device and may include a processor 202, a bus 204, a communications interface 206, and a memory 208. In some examples, the components shown in FIG. 2 may be integrated into a single structure. For example, the components can be within a single housing. In other examples, the components shown in FIG. 2 can be distributed (e.g., in separate housings) and in electrical communication with each other.

The processor 202 may execute one or more operations for implementing some various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Non-limiting examples of a computer-readable medium include (but are not limited to) magnetic disk(s), memory chip(s), ROM, random-access remora ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C#, etc.

The communications interface 206 may interface other network devices or network-capable devices to analyze and receive information related to accessing functions of an application. Information received from the communications interface 206 may be sent to the memory 208 via the bus 204. The memory 208 can store any information received from the communications interface 206.

The memory 208 may include program code for authenticating user requests from mobile devices 130, and providing users with access to the various server resources (e.g., application features or functionality, web pages, services, etc.), based on the location of the mobile devices in comparison to one or more predefined secure location definitions. The memory 208 may include program code for a data store module 210, and a control access module 212 including a location-based authentication data store 214. The location-based authentication data 214 may include data defining the one or more secure locations from which a mobile device 130 can more quickly and easily access certain server resources (e.g., with fewer additional authentication steps required). Also included in the memory 208 is one or more applications or services 216 that may be used to access data from backend data stores (e.g., data store 120 in FIG. 1) and perform various transactions and system functions. In the example of server device 200 that is a financial services server, the server-side applications or services 216 may perform functions including retrieving and modifying financial account information, transferring information or funds between accounts, etc. The data store module 210 may store user account information (e.g., username and password, security information) for a number of users and mobile devices 130, including originating IP addresses of login attempts, browser settings of login attempts, etc. The control access module 212 may validate whether a user access attempt has been successfully authenticated after a user has entered the correct account login information. As discussed above, authentication via the control access module 212 may include tracking and analyzing the current location of a mobile device 130 from which a request is received, and then comparing the location to one or more predefined secure location definitions that may be specific to the particular combination of the mobile device, user, mobile application used (or web domain requested), and the specific features, pages, or functionality requested. In some cases, the control access module 212 may determine that a lower level of authentication (or none at all) should be applied to an access attempt when the current location of the mobile device 130 is within a predefined secure location, where increased levels of authentication may be required when the mobile device 130 is not within a predefined secure location. The results from the control access module 212 may be used to control the permissions and functions available to the user from the applications or services 216.

Figure 3:
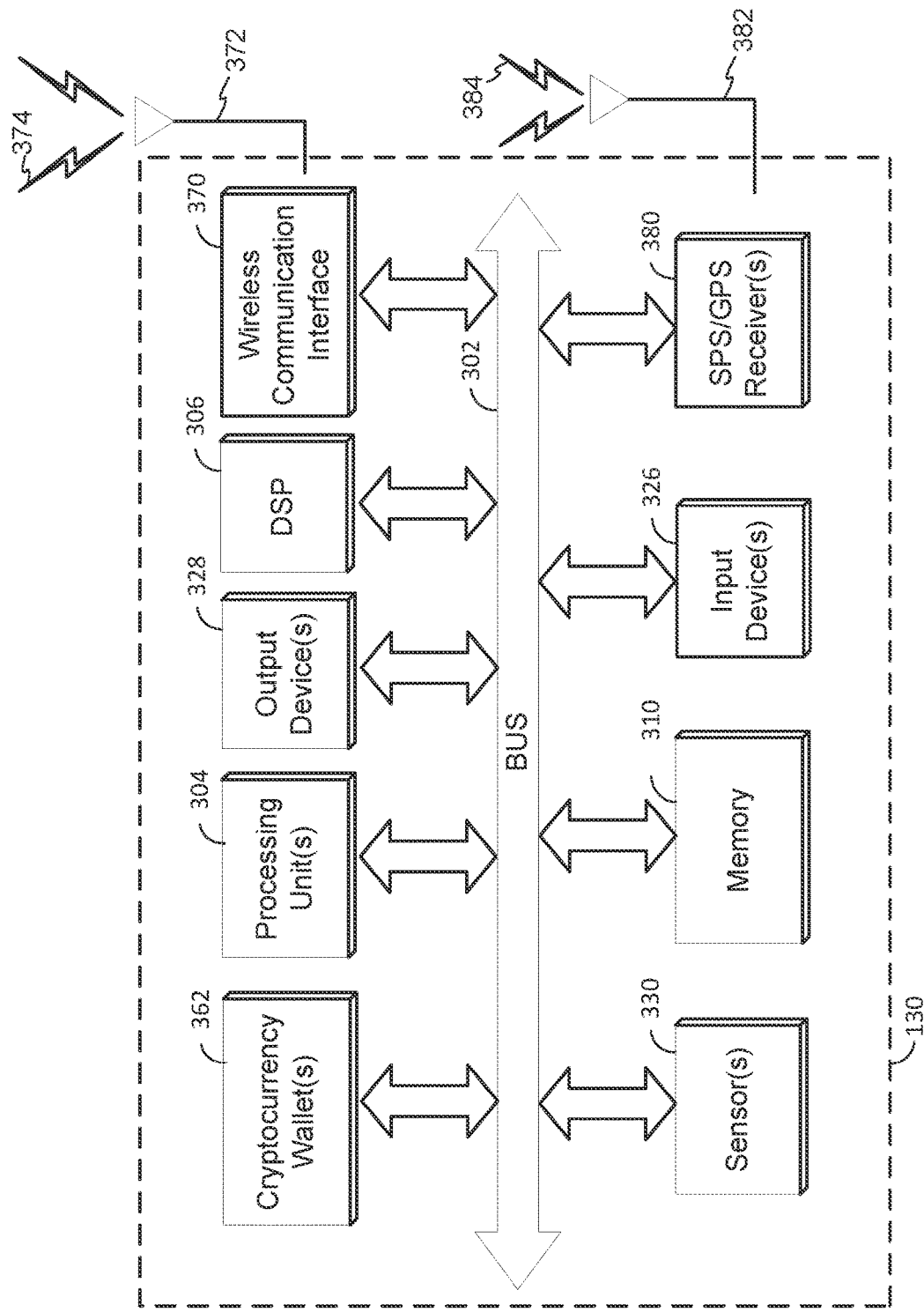
FIG. 3 is a block diagram of a user device usable in a system for authenticating users and providing direct access to pages using locations, according to one example of the present disclosure.

FIG. 3 is a block diagram of a mobile device 130 usable in a system for authenticating user requests and providing access to resources and services based on device location according to one example of the present disclosure. As discussed above, mobile device 130 may include, for example, a smartphone, smartwatch, laptop, tablet computer, as well as other various types of user computing devices (e.g., personal computers, wearable computing devices, vehicle-based computing devices, etc.). Because mobile devices 130 may vary widely in functionality, any particular mobile device 130 may include a subset of the components shown in FIG. 3. Additionally, in some cases, components illustrated in FIG. 3 may be localized to a single physical device or distributed among various networked devices, which may be disposed at different physical locations.

The mobile device 130 includes hardware elements that can be electrically coupled via a bus 302 (or may otherwise be in communication, as appropriate). The hardware elements may include a processing unit(s) 304, which may comprise, without limitation, one or more general-purpose processors, one or more special-purpose processors (such as digital signal processing (DSP) chips, graphics acceleration processors, application specific integrated circuits (ASICs), or the like), or other processing structure, which can be configured to perform one or more of the methods described herein. As shown in FIG. 3, some embodiments may have a separate DSP 306, depending on desired functionality. The mobile device 130 also may include one or more input devices 326, which may be, without limitation, one or more keyboards, mouse, touch screens, touch pads, microphones, buttons, dials, switches, or the like. Input devices 326 may include one or more compatible input components that allow the user to provide various authentication data that may be required when requesting resources or services from a server system 110, including input components such as cameras or optical sensors, infrared (IR) sensors, signature pads and digital pens, voice or facial recognition components, fingerprint scanners, retina scanners, or various other biometric input components. Mobile device 130 also may include one or more output devices 328, which may comprise without limitation, one or more display screens, light emitting diodes (LEDs), projectors, speakers, or the like.

Mobile device 130 may also include a wireless communication interface 370, which may comprise without limitation a modem, a network card, an infrared communication device, a wireless communication device, or a chipset (such as a Bluetooth™ device, an IEEE 802.11 device, an IEEE 802.15.4 device, a Wi-Fi™ device, a WiMax™ device cellular communication facilities, etc.), or the like, which may enable the mobile device 130 to communicate via the networks and servers described above with regard to FIGS. 1-2. The wireless communication interface 370 may permit data to be communicated with a network, wireless access points 145, wireless base stations 142, other computer systems, or any other electronic devices described herein. The communication can be carried out via one or more wireless communication antenna(s) 372 that send or receive wireless signals 374.

Depending on desired functionality, the wireless communication interface 370 may comprise separate transceivers to communicate with base stations (e.g., eNBs) and other terrestrial transceivers, such as wireless devices and access points, belonging to or associated with one or more wireless networks. These wireless networks may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax™ (IEEE 802.16) network, and so on. A CDMA network may implement one or more radio access technologies (RATs) such as cdma2000, Wideband CDMA (WCDMA), and so on. Cdma2000 includes IS-95, IS-2000, or IS-856 standards. A TDMA network may implement GSM, Digital Advanced Mobile Phone System (D-AMPS), or some other RAT. An OFDMA network may employ LTE, LTE Advanced, NR and so on. LTE, LTE Advanced, NR, GSM, and WCDMA are described (or being described) in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth™ network, an IEEE 802.15x, or some other type of network. The techniques described herein may also be used for any combination of WWAN, WLAN or WPAN.

The mobile device 130 may further include sensor(s) 330. Such sensors may comprise, without limitation, one or more accelerometer(s), gyroscope(s), camera(s), magnetometer(s), altimeter(s), microphone(s), proximity sensor(s), light sensor(s), and the like. Some or all of the sensors 330 can be utilized, among other things, for detecting various environmental/contextual data (e.g., sights, sounds, smells, substances, temperatures, etc.) at the location of the mobile device 130, for obtaining operational status of an appliance or electrical device, or for obtaining other types of data that may be communicated to a backend server.

Certain embodiments of mobile devices 130 may also include a Standard Positioning Services (SPS) receiver 380 capable of receiving signals 384 from one or more SPS satellites using an SPS antenna 382, which may be combined with antenna(s) 372 in some implementations. Positioning of mobile devices 130 using SPS receivers 380 may be utilized to complement or incorporate the techniques described herein, and may be used to obtain sensor data by the mobile device 130. The SPS receiver 380 may support measurement of signals from SPS SVs of an SPS system, such as a GNSS (e.g., Global Positioning System (GPS)), Galileo, GLONASS, Quasi-Zenith Satellite System (QZSS) over Japan, Indian Regional Navigational Satellite System (IRNSS) over India, Beidou over China, or the like. Moreover, the SPS receiver 380 may be used with various augmentation systems (e.g., a Satellite Based Augmentation System (SBAS)) that may be associated with or otherwise enabled for use with one or more global or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), or the like. Thus, as used herein an SPS may include any combination of one or more global or regional navigation satellite systems or augmentation systems, and SPS signals may include SPS, SPS-like, or other signals associated with such one or more SPS.

Additionally, in some embodiments the mobile device 130 may include a cryptocurrency wallet 362. Cryptocurrency wallet 362 may include one or more executable software components configured to store private and public keys, and to interact with one or more cryptocurrency blockchains, to enable the mobile device 130 to send and receive digital currency. In some embodiments, one or more types of cryptocurrency may be loaded onto the mobile device 130, along with predefined instructions or rules specifying when and how the cryptocurrency may be exchanged over time. Additionally or alternatively, a mobile device 130 may request and receive transfers of cryptocurrency via communication networks 140 from other mobile devices 130 or remote systems, via a network service provider or other third-party system.

The mobile device 130 may further include or be in communication with a memory 310. The memory 310 may comprise, without limitation, local or network accessible storage, a disk drive, a drive array, an optical storage device, a solid-state storage device, such as a random-n access memory ("RAM"), or a read-only memory ("ROM"), which can be programmable, flash-updateable, or the like. Such storage devices may be configured to implement any appropriate data stores, including without limitation, various file systems, database structures, or the like. The memory 310 may be used, among other things, to store sensor data received from sensors 330 using a database, linked list, or any other type of data structure. In some embodiments, wireless communication interface 370 may additionally or alternatively comprise memory.

The memory 310 of mobile device 130 also may comprise software elements (not shown), including an operating system, device drivers, executable libraries, or other code, such as one or more application programs, which may comprise computer programs provided by various embodiments, or may be designed to implement methods, or configure systems, provided by other embodiments, as described herein. Merely by way of example, one or more procedures described with respect to the functionality for mobile device 130 discussed above might be implemented as code or instructions executable by mobile device 130 (or a processing unit 304 within the mobile device 130). Such code or instructions may be used to configure or adapt a general-purpose computer (or other device) to perform one or more operations in accordance with the techniques described herein.

Figure 4:
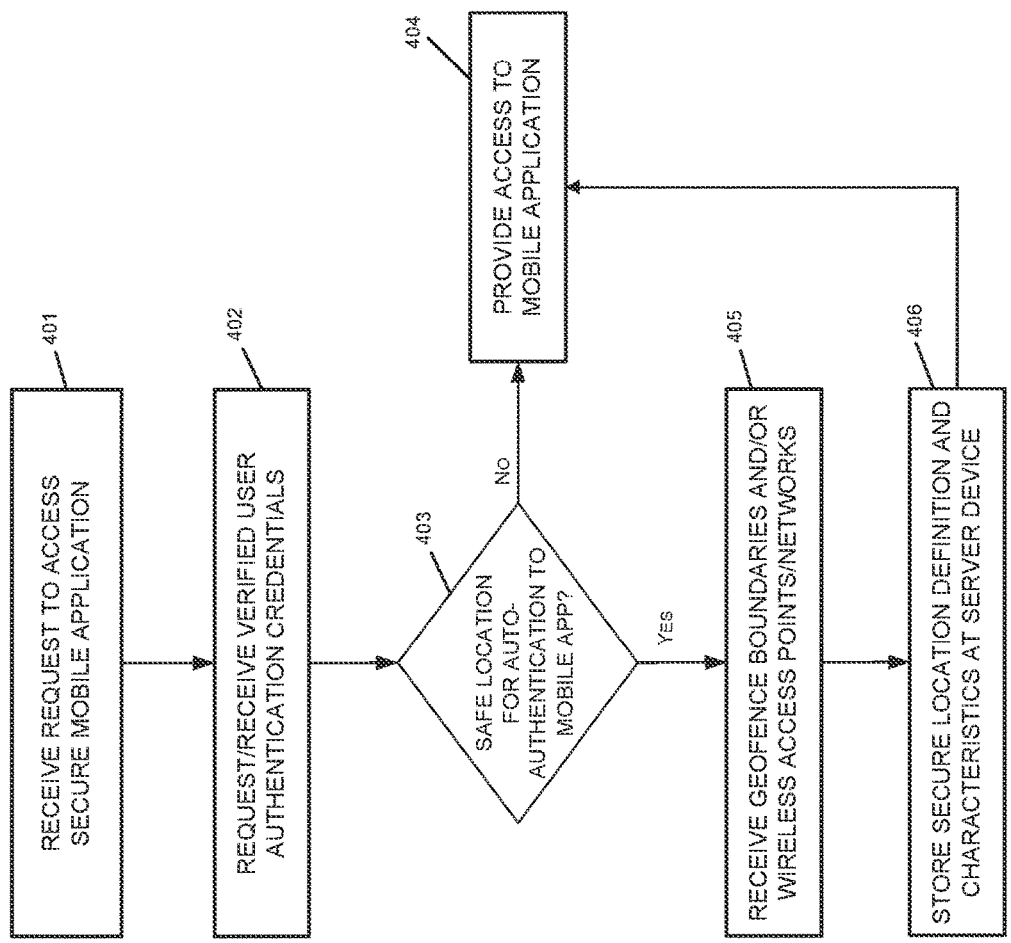
FIG. 4 is a flowchart of a process for performing location-based user authentication or direct access to a specific page or feature within an application or a web site, according to one aspect of the present disclosure.

FIG. 4 is a flowchart of a process for determining and storing a set of secure location definitions to be used by an authentication system to provide access to requested network resources or services, according to one aspect of the present disclosure. As described below, location-based authentication of mobile devices 130 may be performed by a server system 110 to more quickly and efficiently authenticate user requests for secure mobile application features or websites. Thus, the examples of determining and storing secure location definitions to be used for location-based authentication may be described in terms of the same computing environments and devices/systems described above in FIGS. 1-3. However, it should be understood that the techniques and steps described below are not limited to the particular computing systems and hardware components described above in reference to FIGS. 1-3 but may be implemented using various other combinations of devices and systems to perform the various features and functionality described below.

In block 401, a user operating a mobile device 130 may request to access certain secure resources or services from a server system 110. For example, a user may select a secure mobile application installed on the mobile device to be opened/instantiated. A secure mobile application may include any mobile application that requires any additional authentication steps or techniques (e.g., beyond the user logging into the mobile device 130 itself) in order to access certain features of the mobile application. For instance, mobile applications provided by banking or financial services institutions, mobile applications that allow the user to make in-app purchases, that allow the user to access personal or confidential data, or that allows the user to control other computing devices/systems (e.g., home security systems) that may be configured as secure mobile applications to require user authentication within the application to access some or all of certain application features. Thus, the request in block 401 may correspond to the user selecting and opening a secure mobile application or selecting a link within a previously opened mobile application that provides new secure functionality (e.g., logging into a secure user account or client portal, etc.). In response to the user attempting to access the secure mobile application or feature, the mobile application may transmit a corresponding access request to the server device 200, which may be an authentication server 112 or application server 116. Additionally, the request in block 401 need not involve mobile applications, but may instead correspond to a user attempting to access a secure website from a web server 114 via a web browser application installed on the mobile device 130.

In block 402, the server system 110 may request and receive authentication credentials from the user and may verify the authentication credentials to permit the user to access the requested server resources or services. For instance, in response to the access request received from the mobile device 130 in block 401, the server device 200 (e.g., the authentication server 112 or the application server 116 of FIG. 1) may determine and initiate an authentication process to be used for authenticating the access request. In some embodiments, the authentication process may including transmitting a login screen (e.g., username and password) to the mobile device 130 via a secure network protocol, and then receive and verify the credentials from the user. Additionally or alternatively, the server device 200 may use a multi-factor authentication technique, challenge questions, various biometric authentication (e.g. fingerprint identification, retina scanning, iris scanning, facial recognition, ear-recognition technology, voice analysis, etc.), or verify data from an RFID token associated with the user. In this example, it is assumed that the user authentication process in block 402 is successful.

In block 403, the server device 200 may determine whether or not the current location of the mobile device 130 is to be designated as a predefined secure location (or "safe location") for the mobile device 130 to access the secure mobile application. As described below, users may designate physical locations such as their homes, workplaces, vehicles, or other trusted or private locations as safe locations for accessing the secure mobile application in the future. The determination of these safe locations may be used by the server device 200 during future access requests by the mobile device 130 from the same location to automatically authenticate the user (e.g., for full or partial authentication), thereby providing quicker and more efficient user authentication techniques by taking into account the current location of the mobile device 130.

In some embodiments, designating the current location as a "safe location" in block 403 may require a confirmation from the user of the mobile device 130. For example, after a successful login to a secure mobile application (or a secure website) in block 402, the user may access an account settings page, configuration page, etc., of the application or website from which the user may select an option indicating that their current location is a "safe," "secure," "private," or "trusted" location.

Even when a designation of a "safe location" requires an express user confirmation, the server device 200 may be configured to provide recommendations or suggestions to the user, via the secure mobile application or website, that certain locations be designated as safe or trusted locations at block 403. In some cases, after any successful user authentication process in block 402, the secure mobile application or website may prompt the user to indicate whether or not the current physical location of the user is a safe or trusted location for future secure access requests. In other cases, the server device 200 may provide the user with suggestions or recommendations of safe locations based on the previous usage data of the mobile device 130 or application or based on contextual data that may be detected at the mobile device 130 during the user's session with the secure mobile application or website. For example, the server device 200 may suggest the current location as a safe location after a threshold number of successful logins from the location. As another example, the server device 200 may suggest the current location as a safe location in response to detecting certain known or trusted computing devices at the current location such as a mobile device of a family member, a vehicle-based system associated with the user, a home virtual assistant device associated with the user, etc. In contrast, if the server device 200 detects a threshold number of untrusted computing devices at the current location of the mobile device 130, indicating a busy public location, then the server device 200 may not suggest the current location as a safe location at block 403 or may require an additional confirmation from the user before allowing the current location to be designated as safe or trusted.

Additionally or alternatively, in some embodiments, block 403 need not be preceded by blocks 401 and 402. That is, a user may designate one or more safe locations to expedite authentication of future access requests by the mobile device 130, without be required to successfully authenticate with the mobile device 130 from the safe locations. For example, the user may login from a separate location, such as from a desktop computer at their home or work, to setup their predefined secure locations in block 403.

If the current location is not to be designated as a safe location for future access requests from the mobile device 130 (403:No), then at block 404, the server device 200 may provide the mobile device 130 with access to the secure application or website in a normal manner. But, if the user (or the automated processes executing within the server device 200) determines that the current location of the mobile device 130 is to be designated as a safe location (403:Yes), then at block 405, the server device 200 may receive the specific boundaries or characteristics that may be used to define the safe location.

At block 405, the server device 200 may receive data identifying the boundaries of the location to be designated as a safe (or secure) location for future access requests from the mobile device 130. In various embodiments, the server device 200 may support multiple different types of secure location definitions, including geofence locations which are defined by the geographic coordinates of their boundaries, or network connection locations which are defined by the networks or devices used by the mobile device 130 to connect to the server device 200. Thus, if user designates the current location (or selects another location) as a safe location at block 404, then at block 405 a user interface may be presented via the mobile application or website that allows the user to define the type of safe location (e.g., a geofence, a wireless access point, etc.) as well as other suitable characteristics of the safe location.

In such embodiments, if the user indicates that the safe location is a geofenced area, a customized user interface may allow the user to define the geographic coordinates for the geofenced area to be designated as a secure location. For instance, the user may be prompted with an option to define a new geofenced area as a circle within N distance of the current location of the mobile device 130 (e.g., "Designate the area within _____ feet of my current location (e.g., 50 feet, 100 feet, etc.) as a safe location"). As another option, the user interface may present a satellite or street view map of the user's current location, and allow the user to draw the geofence boundaries to be designated as a safe location. For example, a user-defined geofence 150 that is a secure location is shown in FIG. 1. Using such techniques, the user may define a geofenced secure location having any desired size or shape for future access requests from the mobile device 130 to the server device 200.

In other examples, rather than a geofenced secure location, the user can indicate that the safe location is to be defined based on the networks or network devices through which the mobile device 130 connects to the server device 200. For example, a user interface at block 405 may allow the user to select one or more wireless access points 145, wireless networks, or other networks or network components, to define the secure location for future access requests from the mobile device 130. For instance, referring to FIG. 1, if a user of mobile device 130d selects the current wireless access point 145b as a secure location, then the server device 200 may expedite authentication for future access requests from the mobile device 130d that are transmitted via the wireless access point 145b regardless of the geographic location of the mobile device 130. Secure locations may be similarly defined for other wireless access points 145, or for particular wireless networks or access networks. In such cases, the hardware address (e.g. MAC address), network address (e.g. IP address), or other network identifiers may be identified to define the network 1s devices or networks that correspond to the secure location. Additionally or alternatively, in some embodiments, a secure location may be defined based on the proximity of the mobile device 130 to one or more other known computing devices. For example, a secure location may be defined as any location where the mobile device 130 is within a range of a wireless connection (e.g. via Bluetooth™) to another specified device, or when the mobile device is within a particular distance of another specified device, etc.

In addition to receiving data defining the secure location (e.g. geofence boundaries, specific access points or networks, etc.), the server device 200 also may receive additional data at block 405 to define additional characteristics of the newly designated secure location. For example, when defining a secure location via the mobile device 130, the user may specify whether the secure location applies to the mobile device 130, to one or more other mobile devices 130 associated with the user, or a combination thereof. Additionally or alternatively, the user may specify whether the secure location applies to the user, to one or more other users that may have a separate profile or separate access credentials on the same mobile device 130, or a combination thereof. In some cases, users may be prompted to identify a list of secure mobile applications or websites to which the secure location applies and may be prompted to identify a list of the specific pages, features, or functionality within the secure mobile application(s) or website(s) to which the secure location applies. For instance, when defining the characteristics of a new secure location at block 405, the user may indicate that the secure location applies to the secure mobile application or website to which the user logged in in block 402, or may identify one or more other related mobile applications or websites to which the secure location also applies. Similarly, the user may select one or more specific features, pages, or functionality supported by the selected mobile application(s) or website(s) for which the secure location applies. A secure location, thus, may apply to certain application pages or features within a mobile application or website but not to others. For instance, a server device 200 may expedite authentication for a future request from a secure location to access an account balance of the user but would not expedite authentication for future requests to transfer funds using the same secure mobile application, etc. Additionally or alternatively, time and date characteristics, as well as other context data characteristics, may be defined for a new secure location at block 405. For instance, a date or time characteristic may temporally limit the secure location, so the server device 200 may expedite authentication of future access requests from the mobile device 130, but only for requests during the date and time characteristics defined for the secure location.

At block 406, the data defining the secure location and any characteristics of the secure location may be stored by the server device 200. In various embodiments, the secure location definition data may be stored within an authentication server 112, or within a web server 114 or application server 116. In some cases, the secure location definition data may be stored as a listing or table within a location-based authentication data store 214. Table 1, shown below, illustrates the data fields of a secure location definition according to one example of the present disclosure.

TABLE 1

| Listing of Secure Location Definitions | | | | | | |
|---|---|---|---|---|---|---|
| Secure Location ID | Geofence Boundaries or Devices/Networks | Applies to Users | Applies to Mobile Devices | Applies to Mobile Apps/Sites | Applies to Features or Pages | Applies to Dates and Times |

Figure 5:
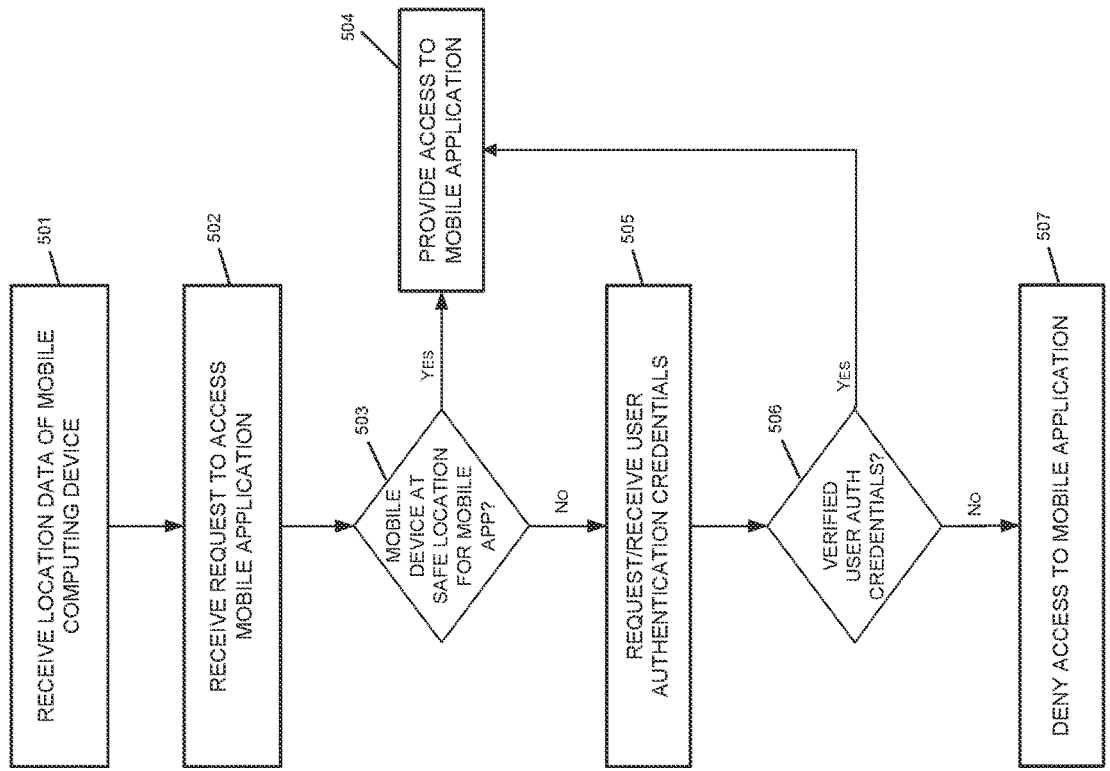
FIG. 5 is a flowchart of a process for performing location-based user authentication or direct access to a specific page or feature within an application or a web site, according to one aspect of the present disclosure.

FIG. 5 is a flowchart of a process for location-based authentication to provide access to requested network resources or services, according to one aspect of the present disclosure. As described below, one or more server devices 200 within server system 110 may track a mobile device 130 using received location data, and may expedite the authentication processes for the mobile device 130 by comparing the location of the mobile device 130 to a list of predefined secure location definitions. Thus, the examples of location-based authentication using predefined secure location definitions may be described in terms of the same computing environments and devices/systems described above in FIGS. 1-3. However, it should be understood that the techniques and steps described below or are not limited to the particular computing systems and hardware components described above in reference to FIGS. 1-3, but may be implemented using various other combinations devices and systems to perform the various features and functionality described below.

At block 501, a server device 200 (e.g., authentication server 112, web server 114, or application server 116 of FIG. 1) may receive and store location data for mobile device 130. In various embodiments, the location data received in block 501 may correspond to any of the various types of location data discussed above that may be used to for secure (or safe) location definitions. Thus, the location data received in block 501 may correspond to geographic coordinates from a GPS receiver or other positioning system of the mobile device 130. Additionally or alternatively, the received location data may identify one or more network devices or access networks through which the mobile device 130 is connected to the communication networks 140 and server device 200. For instance, the received location data may be a hardware identifier (e.g. MAC address) of a wireless access point 145, or an IP address of a network appliance, or network name or identifier of a wireless network, access network, etc. In other embodiments, the location data may correspond to a relative location between the mobile device 130 and another specified device, such as an indication that the mobile device 130 detects the other device via Bluetooth™ or other short-range wireless protocol.

In some cases, the mobile device 130 may be configured to continuously (or periodically, at various different time intervals) transmit current location data of the mobile device 130 to the server device 200. A location transmission routine within the mobile device 130, configured to detect and transmit updated location data, may be managed by a secure mobile application, a browser application, or by an operating system of the mobile device 130. In some cases, the movement sensors of the mobile device 130 (e.g. accelerometer, gyroscope, etc.) may be used to determine when the mobile device 130 is stationary, and the location transmission routine may be configured not to detect or transmit updated location when the mobile device 130 is stationary.

In other cases, the transmission of location data to the server device 200 may be initiated by the server device 200, or by a separate third-party device in some embodiments. For example, the server device 200 may transmit periodic requests to the mobile device 130 to receive updated location data. In other examples, the separate third-party device (e.g. intermediary network device) may track the location of the mobile device 130 and periodically transmit location data to the server device 200.

The location data received by the server device 200 at block 501 may be stored and used to track the location of the mobile device 130. In some embodiments, the server device 200 may implement a location recency threshold corresponding to a duration of time. The location recency threshold may be used to determine, based on calculating a difference between a first time and a second time, whether or not the most recent location data received from a mobile device 130 is too old (or stale) to be reliable for the purposes of location-based authentication and that new location data should be requested from the mobile device 130. If the difference between the first time and the second time is larger than the recency threshold, a request for new location data from the mobile device 130 may be transmitted to the mobile device 130.

Additionally or alternatively, though this example shows the receiving of location data in block 501 occurring before receiving the request for resources or services in block 502, in other examples the location data for the mobile device 130 may be received after (e.g. responsive to) the request from the mobile device 130 at block 502.

At block 502, the server device 200 may receive a request from a mobile device 130 to access certain secure resources or services within the server system 110. Thus, block 502 may be similar or identical to block 401, described above. In some cases, a user operating a mobile device 130 may select a secure mobile application installed on the mobile device 130 to be opened or may select a link within a previously opened mobile application that provides new secure functionality (e.g. logging into a secure user account or client portal, etc.). In other cases, the request in block 502 need not involve mobile applications but may correspond to a user attempting to access a secure website from a web server 114 via a web browser application installed on the mobile device 130.

At block 503, the server device 200 may compare the location data received for the mobile device 130 to one or more predefined secure location definitions associated with the mobile device 130. As discussed above in reference to FIG. 4, a mobile device 130 may have one or more associated secure location definitions that may be predefined for the mobile device 130 and used to expedite authentication of requests from the mobile device 130. Thus, the comparison in block 503 may correspond to a comparison of the current geographic coordinates of the mobile device 130 to the geofence boundary coordinates of one or more predefined secure location definitions. Alternatively or additionally, the comparison in block 503 may correspond to a comparison of the current wireless access point 145, wireless network, access network, or other network components, to the corresponding network/device data within one or more predefined secure location definitions.

Referring again briefly to FIG. 1, an example of a geofence 150 is shown corresponding to a secure location that has been predefined for one or more mobile devices 130. In this example, the geofence is based on the geographic coordinates of the mobile devices 130 rather than on wireless access points, network identifiers or types, etc. If the geofence 150 has been predefined as a secure location for all mobile devices 130*a*-130*e* in FIG. 1, then the comparison in block 503 may be successful for access requests from mobile devices 130*b* and 130*c*, which are inside the geofence 150, but would not be successful for access requests from mobile devices 130*a*, 130*d*, and 130*e*, which are outside of the geofence 150.

As another example, a secure location definition corresponding to the use of wireless access point 145*b* may be predefined for all mobile devices 130*a*-130*e* in FIG. 1. In this example, the comparison at block 503 may be successful for access requests from mobile devices 130*d* and 130*e*, which are currently communicating via WAP 145*b* but would not be successful for access requests from mobile devices 130*a*, 130*b*, and 130*c*, which are not communicating via WAP 145*b*.

Additionally or alternatively, as noted above, a predefined secure location definition also may include additional criteria besides the location of the mobile device 130, including any of the criteria discussed above in FIG. 4 or shown in Table 1. For instance, a predefined secure location definition may include one or more of: a particular set of users to which the secure location applies, a particular set of mobile applications (or websites) to which the secure location applies, a particular set of features or pages within the mobile applications (or websites) to which the secure location applies, or specified dates, time, or other contextual data that may be used to determine when and if the secure location is applicable to the request received at block 502. Thus, at block 503, the available data associated with the mobile device 130 and the access request received at block 502 may be compared to any additional criteria to determine whether or not a predefined secure location may be applied to expedite authentication of the access request. Using these additional criteria, the server device 200 may determine whether or not the secure location may be applied to expedite authentication based on, for example, the current user of the mobile device 130, the secure mobile application or website being accessed, the specific pages or features of the mobile application or website being requested, the date and time of the access request, etc. Any or all of these criteria may be used in combination to determine whether the predefined secure location may be applied to expedite authentication of the request (503:Yes), or whether one or more criteria do not match and the predefined secure location is not applicable (503:No).

The comparisons at block 503 may be performed in response to receiving the access request at block 502 or, alternatively, may be performed before receiving the access request at block 502. For example, in some embodiments, the comparisons at block 503 may be performed in a continuous or periodic loop for a mobile device 130, corresponding to the receiving of location data for the mobile device 130. The server device 200 may store the most recent results of the comparisons, and thus may determine immediately for an incoming access request at block 502 whether or not the access request was transmitted from a predefined secure location.

If the current location of the mobile device 130 matches a predefined secure location (or safe location) associated with the mobile device 130, then at block 504, the server device 200 may provide the mobile device 130 with access to the requested secure mobile application or secure website in the normal manner, avoiding additional authentication processes. In this example, other than the location-based authentication performed via the comparison at block 503, the server device 200 performs no further user authentication or device authentication techniques before providing access to the secure mobile application at block 504. In other examples, matching predefined secure locations may result in an expedited authentication process performed by the server device 200 but the expedited authentication may include one or more additional authentication steps or techniques. For instance, matching a predefined secure location may be paired with one other form of user authentication (e.g. facial recognition, biometrics, username/password, etc.).

In contrast, if the current location of the mobile device 130 does not match one of the predefined secure locations (or safe locations), then an authentication process with additional authentication steps or techniques (i.e. non-expedited process) may be performed at blocks 505 and 506. Blocks 505 and 506 may include similar or identical authentication processes to those discussed above in block 402. Within blocks 505 and 506, the server device 200 may request and receive additional authentication credential data from the user, and attempt to verify the authentication credentials to permit user access the secure mobile application. Various authentication techniques may be used at blocks 505 and 506, including login screens (e.g. username and password), multi-factor authentication techniques, challenge questions, various biometric authentication (e.g. fingerprint identification, retina scanning, iris scanning, facial recognition, ear-recognition technology, voice analysis, etc.), or verifying data from an RFID token associated with the user. The non-expedited authentication process determined and executed by the server device 200 at blocks 505 and 506 may include different or additional authentication techniques from those performed within the expedited authentication process (if any) performed at blocks 503 or 504.

If the non-expedited authentication process determined and executed by the server device 200 at blocks 505 and 506 is successful and the user is successfully authenticated (506:Yes), then at block 504, the server device 200 may provide the mobile device 130 with access to the requested secure mobile application or secure website in a normal manner. In contrast, if the non-expedited authentication process determined and executed by the server device 200 at blocks 505 and 506 is unsuccessful and the user cannot be authenticated (506: No), then at block 507 the server device 200 may deny the mobile device 130 access to the requested secure mobile application or secure website.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer server comprising:
   a processing unit including one or more processors;
   a computer-readable memory storing thereon instructions that are executable by the processing unit to cause the computer server to:
   receive location data from a mobile client device, the location data comprising a set of geographic coordinates of the mobile client device;
   compare the location data to one or more predefined secure location definitions associated with the mobile client device by:
   comparing the set of geographic coordinates of the mobile client device to a set of boundaries of a predefined geofence associated with the mobile client device, wherein the one or more predefined secure location definitions comprise the set of boundaries that indicate one or more locations that are private or trusted for the mobile client device, wherein the set of boundaries of the predefined geofence are definable as an updated secure location via user input that indicates that the predefined geofence is secure within a first particular distance from the set of geographic coordinates of the mobile client device; and comparing the location data to the one or more predefined secure location definitions by comparing an identifier of a wireless access point to a predefined list of secure wireless access points associated with the mobile client device;

receive a request from the mobile client device to access one or more network resources or services provided by the computer server;

in response to the request from the mobile client device:

determine, using a result of comparing the location data and the one or more predefined secure location definitions associated with the mobile client device, an authentication process from among a plurality of authentication processes for providing the mobile client device with access to the network resources or services;

execute the authentication process for providing the mobile client device with access to the network resources or services;

execute, based on matching the location data to at least one predefined location definitions associated with the mobile client device, a first additional authentication process from among the plurality of authentication processes, and successfully authenticate the mobile client device, prior to providing access to requested network resources or services, wherein the first additional authentication process is different than the authentication process;

execute, based on not matching the location data to at least one predefined location definitions associated with the mobile client device, a second additional authentication process from among the plurality of authentication processes that is different than the first additional authentication process and the authentication process;

allow, based on matching the location data to at least one predefined location definitions associated with the mobile client device, the mobile client device to access requested network resources or services and avoid additional authentication processes for the mobile client device; and in response to successfully authenticating the mobile client device, provide the mobile client device with access to the network resources or services.

2. The computer server of claim 1, wherein the instructions that are executable by the processing unit to cause the computer server to execute the authentication process comprise instructions that are executable to:

determine a first time associated with the location data received from the mobile client device;

determine a second time associated with the request from the mobile client device;

compare a difference between the second time and the first time to a location recency threshold, wherein the location recency threshold is a duration of time; and in response to the computer server determining the difference between the second time and the first time is greater than the location recency threshold, request new location data from the mobile client device.

3. The computer server of claim 1, wherein an operation of comparing the location data to one or more predefined secure location definitions includes determining that the mobile client device is not within the one or more locations that are private or trusted for the mobile client device, and wherein the instructions are further executable to:

in response to determining that the mobile client device is at a first location that is not within the one or more locations that are private or trusted for the mobile client device, and in response to successfully authenticating the mobile client device:

providing a recommendation to a user of the mobile client device for storing the first location as a private or trusted location for the mobile client device;

receiving confirmation from the user of the mobile client device indicating that the first location is the private or trusted location for the mobile client device; and receiving data that includes a set of boundaries of the first location for use in providing access in response to future access requests from the mobile client device.

4. The computer server of claim 1, wherein the instructions that are executable by the processing unit to cause the computer server to execute the authentication process comprise instructions that are executable to:

successfully authenticate the mobile client device using the second additional authentication process prior to providing access to requested network resources or services.

5. The computer server of claim 1, wherein the instructions that are executable by the processing unit to cause the computer server to execute the authentication process comprise instructions that are executable to:

access a financial services server to execute the authentication process for providing the mobile client device with access to the network resources or services.

6. The computer server of claim 1, wherein the computer server is configured to receive the request from the mobile client device to access one or more network resources or services provided by receiving the request from a mobile application installed on the mobile client device.

7. The computer server of claim 1, wherein the computer server is configured to provide recommendations or suggestions to a user of the mobile client device that certain locations be designated as predefined secure locations, and wherein the computer server is configured to receive one or more predefined secure location definitions from a user of the mobile client device.

8. The computer server of claim 1, wherein the identifier of the wireless access point is definable as an updated secure wireless access point via user input that indicates that a location corresponding to the wireless access point within a second particular distance is secure.

9. A method comprising:

receiving location data from a mobile client device, the location data comprising a set of geographic coordinates of the mobile client device;

comparing the location data to one or more predefined secure location definitions associated with the mobile client device by:

comparing the set of geographic coordinates of the mobile client device to a set of boundaries of a predefined geofence associated with the mobile client device, wherein the one or more predefined secure location definitions comprise the set of boundaries that indicate one or more locations that are private or trusted for the mobile client device, wherein the set of boundaries of the predefined geofence are defined as an updated secure location via user input that indicates that the predefined geofence is secure within a first particular distance from the set of geographic coordinates of the mobile client device; and comparing the location data to the one or more predefined secure location definitions by comparing an identifier of a wireless access point to a predefined list of secure wireless access points associated with the mobile client device;

receiving one or more requests from the mobile client device to access one or more network resources or services provided by a computer server;

in response to receiving the one or more requests from the mobile client device:

selecting, using a result of comparing the location data and the one or more predefined secure location definitions associated with the mobile client device, an authentication process from among a plurality of authentication processes for providing the mobile client device with access to the network resources or services;

executing the authentication process for providing the mobile client device with access to the network resources or services;

executing, based on matching the location data to at least one predefined location definitions associated with the mobile client device for at least a first request of the one or more requests, a first additional authentication process from among the plurality of authentication processes, and successfully authenticate the mobile client device, prior to providing access to requested network resources or services, wherein the first additional authentication process is different than the authentication process;

executing, based on not matching the location data to at least one predefined location definitions associated with the mobile client device for at least a second request of the one or more requests, a second additional authentication process from among the plurality of authentication processes that is different than the first additional authentication process and the authentication process;

allowing, based on matching the location data to at least one predefined location definitions associated with the mobile client device, the mobile client device to access requested network resources or services and avoid additional authentication processes for the mobile client device; and providing, in response to successfully authenticating the mobile client device, the mobile client device with access to the network resources or services.

10. The method of claim 9, further comprising:
determining a first time associated with the location data received from the mobile client device;
determining a second time associated with the request from the mobile client device;
comparing a difference between the second time and the first time to a location recency threshold, wherein the location recency threshold is a duration of time; and
in response to the computer server determining the difference between the second time and the first time is greater than the location recency threshold, requesting new location data from the mobile client device.

11. The method of claim 9, wherein comparing the location data to one or more predefined secure location definitions includes determining that the mobile client device is not within the one or more locations that are private or trusted for the mobile client device, and wherein the method further comprises:

in response to determining that the mobile client device is at a first location that is not within the one or more locations that are private or trusted for the mobile client device, and in response to successfully authenticating the mobile client device:

providing a recommendation to a user of the mobile client device for storing the first location as a private or trusted location for the mobile client device;

receiving confirmation from the user of the mobile client device indicating that the first location is the private or trusted location for the mobile client device; and receiving data that includes a set of boundaries of the first location for use in providing access in response to future access requests from the mobile client device.

12. The method of claim 9, further comprising:
successfully authenticating the mobile client device using the second additional authentication process, prior to providing access to requested network resources or services.

13. The method of claim 9, wherein executing the authentication process for providing the mobile client device with access to the network resources or services includes accessing a financial services server to execute the authentication process.

14. A non-transitory computer-readable medium comprising instructions that are executable by a processing device for causing the processing device to perform operations comprising:

receive location data from a mobile client device, the location data comprising a set of geographic coordinates of the mobile client device;

compare the location data to one or more predefined secure location definitions associated with the mobile client device by:

comparing the set of geographic coordinates of the mobile client device to a set of boundaries of a predefined geofence associated with the mobile client device, wherein the one or more predefined secure location definitions comprise the set of boundaries that indicate one or more locations that are private or trusted for the mobile client device, wherein the set of boundaries of the predefined geofence are definable as an updated secure location via user input that indicates that the predefined geofence is secure within a first particular distance from the set of geographic coordinates of the mobile client device; and comparing the location data to the one or more predefined secure location definitions by comparing an identifier of a wireless access point to a predefined list of secure wireless access points associated with the mobile client device;

receive a request from the mobile client device to access one or more network resources or services provided by a computer server;

in response to the request from the mobile client device:
determine, using a result of comparing the location data and the one or more predefined secure location definitions associated with the mobile client device, an authentication process for providing the mobile client device with access to the network resources or services;

execute the authentication process for providing the mobile client device with access to the network resources or services;

execute, based on matching the location data to at least one predefined location definitions associated with the mobile client device, a first additional authentication process among a plurality of authentication processes, and successfully authenticate the mobile client device, prior to providing access to requested network resources or services, wherein the first additional authentication process is different than the authentication process;

execute, based on not matching the location data to at least one predefined location definitions associated with the mobile client device, a second additional authentication process from among the plurality of authentication processes that is different than the first additional authentication process and the authentication process;

allow, based on matching the location data to at least one predefined location definitions associated with the mobile client device, the mobile client device to access requested network resources or services and avoid additional authentication processes for the mobile client device; and in response to successfully authenticating the mobile client device, provide the mobile client device with access to the network resources or services.

15. The non-transitory computer-readable medium of claim 14, wherein the instructions that are executable by the processing device to cause the processing device to execute the authentication process comprise instructions that are executable to:

determine a first time associated with the location data received from the mobile client device;

determine a second time associated with the request from the mobile client device;

compare a difference between the second time and the first time to a location recency threshold, wherein the location recency threshold is a duration of time; and in response to the computer server determining the difference between the second time and the first time is greater than the location recency threshold, request new location data from the mobile client device.

16. The non-transitory computer-readable medium of claim 14, wherein an operation of comparing the location data to one or more predefined secure location definitions includes determining that the mobile client device is not within the one or more locations that are private or trusted for the mobile client device, and wherein the instructions are further executable to:

in response to determining that the mobile client device is at a first location that is not within the one or more locations that are private or trusted for the mobile client device, and in response to successfully authenticating the mobile client device:

providing a recommendation to a user of the mobile client device for storing the first location as a private or trusted location for the mobile client device;

receiving confirmation from the user of the mobile client device indicating that the first location is the private or trusted location for the mobile client device; and receiving data that includes a set of boundaries of the first location for use in providing access in response to future access requests from the mobile client device.

17. The non-transitory computer-readable medium of claim 14, wherein the instructions that are executable by the processing device to cause the computer server to execute the authentication process comprise instructions that are executable to:

successfully authenticate the mobile client device using the second additional authentication process, prior to providing access to requested network resources or services.

* * * * *